(12) United States Patent
Liu et al.

(10) Patent No.: US 9,079,136 B2
(45) Date of Patent: Jul. 14, 2015

(54) THIN, POROUS METAL SHEETS AND METHODS FOR MAKING THE SAME

(75) Inventors: Wei Liu, Richland, WA (US); Xiaohong Shari Li, Richland, WA (US); Nathan L. Canfield, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 403 days.

(21) Appl. No.: 13/032,752

(22) Filed: Feb. 23, 2011

(65) Prior Publication Data

US 2011/0155662 A1 Jun. 30, 2011

Related U.S. Application Data

(63) Continuation-in-part of application No. 12/470,294, filed on May 21, 2009, and a continuation-in-part of application No. 12/817,694, filed on Jun. 17, 2010, which is a continuation-in-part of application No. 12/470,294, filed on May 21, 2009.

(60) Provisional application No. 61/218,521, filed on Jun. 19, 2009.

(51) Int. Cl.
*B01D 67/00* (2006.01)
*B01D 39/20* (2006.01)
(Continued)

(52) U.S. Cl.
CPC ........ *B01D 67/0041* (2013.01); *B01D 39/2051* (2013.01); *B01D 67/0046* (2013.01);
(Continued)

(58) Field of Classification Search
CPC .... B01D 67/0041; B22F 3/11; Y10T 29/4918

USPC .................................... 428/550; 210/500.23
IPC ............. B22F 2998/10,3/22, 3/11; C22C 19/03
See application file for complete search history.

(56) References Cited

U.S. PATENT DOCUMENTS 3,577,226 A   5/1971   Elbert et al.
4,525,704 A   6/1985   Campbell et al.
(Continued)

FOREIGN PATENT DOCUMENTS

WO           00/53297 A1      9/2000
WO           WO2006/049940    11/2006
(Continued)

OTHER PUBLICATIONS

Aoki, Kanna, et al., "Gas permeation properties of A-type zeolite membrane formed on porous substrate by hydrothermal synthesis," Journal of Membrane Science, 1998, 197-205 pps., vol. 141, Elsevier.
(Continued)

*Primary Examiner* — Weiping Zhu
(74) *Attorney, Agent, or Firm* — Klarquist Sparkman, LLP

(57) ABSTRACT

Thin, porous metal sheets and methods for forming them are presented to enable a variety of applications and devices. The thin, porous metal sheets are less than or equal to approximately 200 μm thick, have a porosity between 25% and 75% by volume, and have pores with an average diameter less than or equal to approximately 2 μm. The thin, porous metal sheets can be fabricated by preparing a slurry having between 10 and 50 wt % solvent and between 20 and 80 wt % powder of a metal precursor. The average particle size in the metal precursor powder should be between 100 nm and 5 μm.

28 Claims, 16 Drawing Sheets

(51) Int. Cl.

| | | |
|---|---|---|
| B01D 69/10 | (2006.01) | |
| B01D 71/02 | (2006.01) | |
| B01J 20/32 | (2006.01) | |
| B22F 3/11 | (2006.01) | |
| B22F 3/22 | (2006.01) | |
| B22F 5/00 | (2006.01) | |
| C22C 19/00 | (2006.01) | |
| C22C 19/03 | (2006.01) | |
| C22C 38/08 | (2006.01) | |
| B01D 69/06 | (2006.01) | |

(52) U.S. Cl.
CPC ............ *B01D67/0058* (2013.01); *B01D 69/06* (2013.01); *B01D 69/10* (2013.01); *B01D 71/022* (2013.01); *B01J 20/3204* (2013.01); *B01J 20/3297* (2013.01); *B22F 3/1121* (2013.01); *B22F 3/22* (2013.01); *B22F 5/006* (2013.01); *C22C 19/002* (2013.01); *C22C 19/03* (2013.01); *C22C 38/08* (2013.01); *B01D 2239/10* (2013.01); *B01D 2239/1216* (2013.01); *B01D 2323/08* (2013.01); *B01D 2323/18* (2013.01); *B01D 2325/10* (2013.01); *B01D 2325/12* (2013.01); *B01D 2325/24* (2013.01); *B22F 2998/10* (2013.01); *Y10T 428/12014* (2015.01)

(56) References Cited

U.S. PATENT DOCUMENTS

| | | | |
|---|---|---|---|
| 5,019,263 | A | 5/1991 | Haag et al. |
| 5,242,559 | A * | 9/1993 | Giorgi ........................... 204/491 |
| 5,312,582 | A | 5/1994 | Donado |
| 5,456,740 | A * | 10/1995 | Snow et al. ........................ 96/11 |
| 5,846,664 | A * | 12/1998 | Third et al. ................... 428/550 |
| 5,871,650 | A | 2/1999 | Lai et al. |
| 5,985,475 | A | 11/1999 | Reynolds et al. |
| 6,326,326 | B1 | 12/2001 | Feng et al. |
| 6,692,626 | B2 | 2/2004 | Keefer et al. |
| 6,929,705 | B2 | 8/2005 | Myers et al. |
| 6,946,015 | B2 | 9/2005 | Jorgensen et al. |
| 2001/0006158 | A1 | 7/2001 | Ho et al. |
| 2004/0201119 | A1 | 10/2004 | Kuhstoss et al. |
| 2008/0102358 | A1 | 5/2008 | Kowalczyk et al. |
| 2008/0268327 | A1 | 10/2008 | Gordon et al. |
| 2009/0114594 | A1 | 5/2009 | Sirkar |
| 2009/0232692 | A1 | 9/2009 | Wada et al. |

FOREIGN PATENT DOCUMENTS

| | | |
|---|---|---|
| WO | WO2006/050531 | 11/2006 |
| WO | WO2009/005745 | 8/2009 |

OTHER PUBLICATIONS

Liu, Wei, et al., "High Surface Area Inorganic Membrane for Process Water Removal," U.S. Department of Energy Initiative Flier, 2 pages.
Geus, Eduard, et al., "High-temperature stainless steal supported zeolite (MFI) membranes: preparation, module construction, and permeation experiments," Microporous Materials, 131-147 pps., vol. 1, Elsevier Science Publishers B.V., Amsterdam.
Jafar, Jalal J., et al., "Separation of alcohol/water mixtures by pervaporation through zeolite A membranes," Microporous Materials, vol. 12, 1997, 305-311 pps., Elsevier.
Piera, Elena, et al., "High separation selectivity with imperfect zeolite membranes," ChemComm, 1999, 1309-1310 pps., Zaragoza, Spain.
Wee, Shin-Ling, et al., "Membrane separation process—Pervaporation through zeolite membrane," Separation and Purification Technology, 2008, vol. 63, 500-516 pps.
Morigami, Yoshio, et al., "The first large-scale pervaporation plant using tubular-type module with zeolite NaA membrane," Separation and Purification Technology, vol. 25, 2001, 251-260, pps., Elsevier, Japan.
Holmes, S.M., et al., "Zeolite A Membranes for use in Alcohol/Water Separations," Institute of Chemical Engineers, Trans IChemE, Nov. 2000, vol. 78, Part A., 1084-1088 pps.
Sato, Kiminori, et al., "A high reproducible fabrication method for industrial production of high flux NaA zeolite membrane," Journal of Membrane Science, vol. 301, 2007, 151-161 pps., Elsevier, Japan.
Wang, Zhengbao, et al., "High Performance Zeolite LTA Pervaporation Membranes on Ceramic Hollow Fibers by Dipcoating—Wiping Seed Deposition," J. Am. Chem. Soc., vol. 131, 2009, 6910-6911 pps., American Chemical Society.
Wang, Zhengbao, et al., "High Performance Zeolite LTA Pervaporation Membranes on Ceramic Hollow Fibers by Dipcoating-Wiping Seed Deposition," S1-S6 pps., 2009.
Liu, Wei, et al., "Micro-structured Inorganic Membrane Reactor," Presentation at the 9th International Congress on Membranes and Membrane Processes, Jul. 18, 2008, Honolulu, Hawaii, USA.
Bao, L. et al., "Facilitated transport of CO2 across a liquid membrane: Comparing enzyme, amine, and alkaline," Journal of Membrane Science, vol. 280, pp. 330-334 (Mar. 2, 2006).
Bara, J. et al., "Guide to CO2 Separations in Imidazolium-Based Room-Temperature Ionic Liquids," Ind. Eng. Chem. Res., vol. 48, No. 6, pp. 2739-2751 (Feb. 11, 2009).
Camper, D. et al., "Bulk-fluid solubility and membrane feasibility of Rmim-based room-temperature ionic liquids," Ind. Eng. Che. Res., vol. 45, pp. 6279-6283 (Aug. 8, 2006).
Chen, H. et al., "Immobilized glycerol-based liquid membranes in hollow fibers for selective CO2 separation from CO2—N2 mixtures," Journal of Membrane Science, vol. 183, No. 1, pp. 75-88 (Feb. 28, 2001).
Deng, L. et al., "Facilitated transport of CO2 in novel PVAm/PVA blend membrane," J. Mem. Sci., vol. 340, pp. 154-163 (May 23, 2009).
Dong, J. et al., "Multicomponent Hydrogen/Hydrocarbon Separation by MFI-Type Zeolite Membranes," AIChE Journal, vol. 46, No. 10, pp. 1957-1966 (Oct. 2000).
El-Azzami, L.A. et al., "Parametric Study of CO2 Fixed Carrier Facilitated Transport through Swollen Chitosan Membranes," Ind.& Eng. Chem. Res., vol. 48, No. 2, pp. 894-902 (Jan. 21, 2009).
Favre, E., "Carbon dioxide recovery from post-combustion processes: Can gas permeation membranes compete with absorption," Journal of Membrane Science, vol. 294, Nos. 1-2), pp. 50-59 (Feb. 9, 2007).
Gu, X. et al., "Synthesis of Defects-Free FAU-Type Zeolite Membranes and Separation for Dry and Moist CO2/N2 Mixtures," Ind. Eng. Chem. Res., vol. 44, No. 4, pp. 937-944 (Feb. 16, 2005).
Gu, Y. et al., "Ionic liquids-based catalysis with solids: state of the art," Adv. Synth. Catal., vol. 351, pp. 817-847 (Apr. 6, 2009).
Hanioka, S. et al, "CO2 separation facilitated by task-specific ionic liquids using a supported liquid membrane," Journal of Membrane Science, vol. 314, pp. 1-4 (Jan. 24, 2008).
Harlick, P.J.E. et al., "Applications of Pore-Expanded Mesoporous Silicas. 3. Triamine Silane Grafting for Enhanced CO2 Adsorption," Ind. Eng. Chem. Res., vol. 45, pp. 3248-3255 (Mar. 22, 2006).
Harlick, P.J.E. et al., "Applications of Pore-Expanded Mesoporous Silica. 5. Triamine Grafted Material with Exceptional CO2 Dynamic and Equilibrium Adsorption Performance," Ind. Eng. Chem. Res., vol. 46, pp. 446-458 (Jan. 17, 2007).
Harris, F. et al., "Solubilities of Carbon Dioxide and Densities off Aqueous Sodium Glycinate Solutions before and after CO2 Absorption," J. Chem. Eng. Data, vol. 54, pp. 144-147 (Jan. 8, 2009).
Huang, J. et al., "Carbon Dioxide Capture Using a CO2-Selective Facilitated Transport Membrane," Ind. Eng. Chem. Res., vol. 47, No. 4, pp. 1261-1267 (Jan. 16, 2008).
Hwang, K. et al., "Reaction kinetics between carbon dioxide and glycidyl methacrylate using trihexylamine immobilized ionic liquid id on MCM41 catalyst," J. Ind. and Eng. Chem., vol. 15, pp. 854-859 (Nov. 25, 2009).
Ilconich, J. et al., "Experimental investigation of the permeability and selectivity of supported ionic liquid membranes for CO2/He separation at temperatures up to 125oC," Journal of Membrane Science, vol. 298, pp. 41-47 (Apr. 6, 2007).

(56) References Cited

OTHER PUBLICATIONS

Kai, T. et al., "Development of cesium-incorporated carbon membranes for CO2 separation under humid conditions," Journal of Membrane Science, vol. 342, pp. 14-21 (Jun. 17, 2009).

Koros, W. et al., "Pushing the limits on possibilities for large scale gas separation: which strategies?," Journal of Membrane Science, vol. 175, No. 2, pp. 181-196 (Aug. 10, 2000).

Koros, W. et al., "Pushing the limits on possibilities for large scale gas separation: which strategies?," Journal of Membrane Science, vol. 181, p. 141 (Jan. 15, 2001).

Li, L. et al., "Stabilization of Metal Nanoparticles in Cubic Mesostructured Silica and Its Application in Regenerable Deep Desulfurization of Warm Syngas," Chem. Mater., vol. 21, pp. 5358-5364 (Oct. 22, 2009).

Li, Y. et al., "Pervaporation and vapor permeation dehydration of Fischer-Tropsch mixed-alcohols by LTA zeolite membranes," Separation and Purification Technology, vol. 57, p. 140-146 (Oct. 1, 2007).

Lin, H. et al., "Materials selection guidelines for membranes that remove CO2 from gas mixtures," Journal of Molecular Structure, vol. 739, pp. 57-74 (Apr. 2005).

Liu, W. et al., "Critical Material and Process Issues for CO2 Separation from Coal-Powered Plants," JOM, vol. 41, No. 4, pp. 36-44 (Apr. 2009).

Luis, P. et al., "Facilitated transport of CO2 and SO2 through Supported Ionic Liquid Membranes (SILMs)," Desalination, vol. 245, pp. 485-493 (Sep. 15, 2009).

Masuda, T. et al., "Preparation of hydrophilic and acid-proof silicalite-1 zeolite membrane and its application to selective separation of water from water solutions of concentrated acetic acid by pervaporation," Separation and Purification Technology, vol. 32, p. 181-189 (Jul. 1, 2003).

Mineo, P.G. et al., "Very fast CO2 response and hydrophobic properties of novel poly(ionic liquid)s," J. of Materials Chem., vol. 19, No. 46, pp. 8861-8870 (Oct. 19, 2009).

Morigami, Y. et al., "The first large-scale pervaporation plant using tubular-type module with zeolite NaA membrane," Separation and Purification Technology, vol. 25, p. 251-260 (Oct. 1, 2001).

National Energy Technology Laboratory (NETL) "Carbon Dioxide Capture from Existing Coal-Fired Power Plants," DOE/NETL-401/110907, Final Report (Original Issue Date, Dec. 2006), Revision Date, Nov. 2007.

National Energy Technology Laboratory (NETL), "Cost and Performance Baseline for Fossil Energy Plants," DOE/NETL-2007/1281, vol. 1: Bituminous Coal and Natural Gas to Electricity, Final Report (Original Issue Date, May 2007), Revision 1, Aug. 2007.

Sandru, M. et al., "Composite hollow fiber membranes for CO2 capture," Journal of Membrane Science, vol. 346, pp. 172-186 (Jan. 1, 2010).

Sebastian, V. et al., "Zeolite membrane for CO2 removal: Operating at high pressure," Journal of Membrane Science, vol. 292, pp. 92-97 (Jan. 24, 2007).

Shekhawat, D. et al., "A Review of Carbon Dioxide Selective Membranes," US DOE Topical Report, DOE/NETL-2003/1200 (Dec. 1, 2003).

Tang, J. et al., "Enhanced CO2 Absorption of Poly(ionic liquid)s," Macromolecules, vol. 38, pp. 2037-2039 (Feb. 18, 2005).

Tang, J. et al., "Low-temperature CO2 sorption in ammonium-based poly(ionic liquid)s," Polymer, vol. 46, pp. 12460-12467 (Nov. 4, 2005).

Ward, W. et al, "Carbon Dioxide-Oxygen Separation: Facilitated Transport of Carbon Dioxide Across a Liquid Film," Science, vol. 156, pp. 1481-1484 (Jun. 16, 1967).

Xomeritakis, G. et al, "Tubular ceramic-supported sol-gel silica-based membranes for flue gas carbon dioxide capture and sequestration," Journal of Membrane Science, vol. 341, pp. 30-36 (May 23, 2009).

Yan, T.Y. et al., "Adsorption of CO2 on the Rutile (110) Surface in Ionic Liquid. A Molecular Dynamics Simulation," J. of Phys. Chem. C, vol. 113, No. 45, pp. 19389-19392 (Oct. 19, 2009).

International Search Report/Written Opinion for International Application No. PCT/US2011/063405, Mailing Date Jul. 9, 2012.

International Search Report/Written Opinion for International Application No. PCT/US2011/031342, Mailing Date Jul. 27, 2011.

Yegani, R. et al., "Selective separation of CO2 by using novel facilitated transport membrane at elevated temperatures and pressures," Journal of Membrane Science, vol. 291, pp. 157-164 (Jan. 18, 2007).

Yokozeki, A. et al., "Hydrogen purification using room-temperature ionic liquids," Applied Energy, vol. 84, pp. 351-361 (Mar. 2007).

Yu, G. et al., "Design of task-specific ionic liquids for capturing CO2: A molecular orbital study," Ind. Eng. Chem. Res, vol. 45, No. 8, pp. 2875-2880 (Feb. 24, 2006).

Yu, G.R. et al., "Structure, Interaction and Property of Amino-Functionalized Imidazolium ILs by Molecular Dynamics Simulation and Ab Initio Calculation," AIChE J., vol. 53, No. 12, pp. 3210-3221 (Dec. 2007).

Zhang, J. et al., "Supported Absorption of CO2 by Tetrabutylphosphonium Amino Acid Ionic Liquids," Chem. Eur. Journal, vol. 12, pp. 4021-4026 (May 15, 2006).

Zhang, S. et al., "Fixation and conversion of CO2 using ionic liquids," Catalysis Today, vol. 115, pp. 61-69 (Mar. 29, 2006).

Zhang, Y. et al., "Dual Amino-Functionalised Phosphonium Ionic Liquids for CO2 Capture," Chem. Eur. J., vol. 15, pp. 3003-3011 (Mar. 9, 2009).

Zheng, F. et al., "Ethylenediamine-Modified SBA-15 as Regenerable CO2 Sorbent," Ind. & Eng. Chem. Res., vol. 44, pp. 3099-3105 (Mar. 25, 2005).

Zou, J. et al., "CO2-selective polymeric membranes containing amines in crosslinked poly(vinyl alcohol)," Journal of Membrane Science, vol. 286, pp. 310-321 (Oct. 10, 2006).

Written Opinion of the International Searching Authority, dated Dec. 6, 2010, for Application No. PCT/US2010/035543.

International Search Report of the International Searching Authority, dated Dec. 6, 2010, for Application No. PCT/US2010/035543.

\* cited by examiner

1 μm

1 μm

1 μm

| | Sintering/Reduction Approach | Direct Reduction Approach |
|---|---|---|
| Exterior Surface |  5 μm |  5 μm |
| Fractured Thickness |  5 μm |  5 μm |

EDS-determined Composition

| Element | 800°C | 1100°C |
|---|---|---|
| C | 0.57 | 0 |
| O | 1.00 | 0 |
| Si | 0 | 1.2 |
| Fe | 21.9 | 21.0 |
| Ni | 73.2 | 73.0 |
| Cu | 2.2 | 3.4 |
| Mo | 1.1 | 1.3 |

EDS-determined Composition

| Element | 1100°C |
|---|---|
| Fe | 75.6 |
| Cr | 17.2 |
| Ni | 7.2 |

| At% | Area 1 | Point 1 | Point 2 | Point 3 (NiO) | Point 4 (NiO) |
|---|---|---|---|---|---|
| OK | 5.31 | 2.53 | 3.06 | 44.98 | 37.33 |
| CrK | 0.15 | 0.06 | 0.09 | 0.1 | 0.09 |
| FeK | 0.49 | 0.26 | 0.29 | 0.31 | 0.36 |
| NiK | 94.06 | 97.14 | 96.56 | 54.61 | 62.22 |

| At% | Large Area | Point 1 (Center) | Point 2 (Center) | Point 2 (Edge) |
|---|---|---|---|---|
| OK | 5.22 | 3.99 | 2.71 | 3.36 |
| AlK | 0.15 | 0.24 | 0.17 | 0.17 |
| SiK | 0.29 | 0 | 0 | 0 |
| CrK | 0.22 | 0.12 | 0.15 | 0.69 |
| FeK | 0.93 | 0.5 | 0.5 | 2.76 |
| NiK | 93.01 | 94.96 | 96.33 | 92.85 |
| ZrL | 0.19 | 0.18 | 0.15 | 0.17 |

| | Ni Sheet | Ni Sheet impregnated with 20 wt% ZrO₂ colloidal solution |
|---|---|---|
| Treated for 4 hours at 850°C in 3%H₂/N₂ |  1 μm |  1 μm |
| Treated for 4 hours at 950°C in 3%H₂/N₂ |  1 μm |  1 μm |

THIN, POROUS METAL SHEETS AND METHODS FOR MAKING THE SAME

PRIORITY CLAIM AND RELATED APPLICATIONS

This invention claims priority from and is a continuation-in-part of currently pending U.S. patent application Ser. No. 12/817,694, filed Jun. 17, 2010, and is a continuation-in-part of U.S. patent application Ser. No. 12/470,294, filed May 21, 2009. U.S. patent application Ser. No. 12/817,694 also claims priority from U.S. Provisional Patent Application 61/218,521, filed Jun. 19, 2009. Each of the applications are incorporated herein by reference.

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

Thin, porous metal sheets can enable a variety of applications and devices requiring materials that are relatively light weight, highly permeable, mechanically strong, flexible, chemically stable, and thermally stable. For example, a thin porous metal sheet can serve as a quality support structure for inorganic membranes enabling high-performance membrane processing at elevated temperatures. Traditional porous metals and the methods by which they are made, have typically not been able to simultaneously achieve these seemingly contradictory attributes. For example, many of the metal foam and/or screen products are not mechanically robust enough to be formed into thin sheets (e.g., less than 300 µm). Furthermore, the pore sizes of most metal foams and screen products are too large to effectively support additional materials such as membranes. Furthermore, traditional methods for making thin, porous metal sheets can be expensive and can use highly reactive materials such as very small metal particles. Accordingly, improved thin, porous metal sheets and alternative methods for forming them are desirable.

SUMMARY

The present invention includes thin, porous metal sheets that are less than or equal approximately 200 µm thick, have a porosity between 25% and 75% by volume, and have pores with an average diameter less than or equal to approximately 2 µm. While embodiments of the present invention can utilize any metal for the thin, porous metal sheets, metals comprising Ni, Ne Fe alloys, Ni—Cu stainless steel alloys, Ti, Ti alloys, and combinations thereof are particularly relevant. The properties associated with embodiments of the present invention can enable a variety of applications and devices. For example, the thin, porous metal sheets can support a variety of materials for applications that include, but are not limited to, membrane separations, microfiltration, adsorption, and catalysis. Furthermore, the porous metal sheets can be further utilized, for example, in an electrode for energy storage devices.

The thin, porous metal sheets can be fabricated by preparing a slurry comprising between 10 and 50 wt % solvent and between 20 and 80 wt % powder of a metal precursor. The average particle size in the metal precursor powder should be between 100 nm and 5 µm. In preferred embodiments, the metal precursor comprises metal oxides, metal hydrides and metal organics, and especially oxides associated with Ni, Ne Fe alloys, Ni—Cu alloys, stainless steel alloys, metal hydrides associated with Ti, and Ti alloys.

In some embodiments, the slurry can further include up to 30 wt % pore former, which comprises average particle sizes between 100 nm and 10 µm. Exemplary pore formers can include, but are not limited to carbon black, graphite, coke, starch materials, and combinations thereof. Further still, the slurry can comprise up to 15 wt % organic additives. Examplary organic additives can include, but are not limited to, dispersants, binders, plasticizers, and combinations thereof. Preferably, the slurry is prepared by ball-milling the constituents of the slurry.

As appropriate and/or deemed necessary, the homogeneity and stability of the slurry can be verified prior to casting the green body. For example, one test involves confirming that no solids sediment out when the slurry is left undisturbed for at least 30 minutes.

The slurry can then be cast into a green body having a thickness between 10 and 200 µm. The green body can be dried first for removal of volatile solvent. Then, the green body is fired to convert the metal precursor into a metallic state and to remove the solvent along with many of the other slurry constituents (e.g., any pore former or organic additives) to yield a fired body. The fired body is then sintered and annealed to yield the thin, porous metal sheet having a metallic backbone of networked pore structures in three dimensions. The porosity of the thin, porous metal sheets is between 75% and 75% by volume and the average pore diameter is less than or equal to 2 µm.

In one embodiment, firing comprises heating the green body in a reducing environment at a ramp rate between 0.2 and 10° C. per minute to a firing temperature between 400 and 1200° C. The firing temperature is maintained for a time period between 30 minutes and 24 hours. During firing, the metal precursor is directly reduced to the metallic state. Alternatively, firing the green body can comprise first heating the green body in an oxidizing environment to a first temperature and then heating in a reducing environment at a second temperature. The first temperature is between 800 and 1400° C. and the second temperature is between 400 and 1200° C. Preferably, the ramp rate to the first temperature is less than or equal to 10° C. per minute, In preferred embodiments, the sintering, annealing, and/or flattening occur in inert or reducing environments at temperatures that are not greater than the melting point of the fired body and are substantially equal to the softening point. Typically, the temperature is between 600° C. and 1200° C. Flattening can be conducted by applying a load (or pressure) onto the porous metallic body against a solid, smooth surface In one embodiment, the slurry can be cast into two or more green body sheets each having a thickness between 10 and 100 µm. The green body sheets are laminated into a single laminate and fired to yield a fired body. Lamination can comprise stacking the green body sheets together and fusing them together under pressure and at an elevated temperature. The green body sheets can be formed from a single slurry composition to yield equivalent sheets. Alternatively, the green body sheets can be formed from different slurry compositions to yield sheets having varying compositions, thicknesses, and/or structures. For example, a plurality of green body sheets each having a different composition or pore structure can be laminated to yield a single laminate having a graded composition or pore structure. In a particular example, a first green body sheet cast from a slurry having a first composition is laminated with another green body sheet cast from a slurry having a second composition. After firing, sintering, annealing, and/or flattening, the resultant porous metal sheet can have one side with pores having an average diameter less than 10 µm (resulting from the first slurry) a second side with pores having an average diameter less than 2 µm (resulting from the second slurry).

As stated elsewhere herein, the thin, porous metal sheets of the present invention can enable a number of applications and devices. In one embodiment, the thin porous metal sheet serves as a filter for microfiltration. Accordingly, the porous metal sheet separates a filtrate on a first side of the sheet from a retentate on the second side, wherein particles of the retentate are at least 0.1 µm in size. Furthermore, the metal sheets can be utilized in electrodes for energy storage devices.

Further still, the thin, porous metal sheets can support a variety of materials including catalysts, adsorbents and/or membranes. In a particular example, a ceramic material having pores with an average pore size between 5 and 200 nm is deposited on the thin, porous metal sheet.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. White the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1:
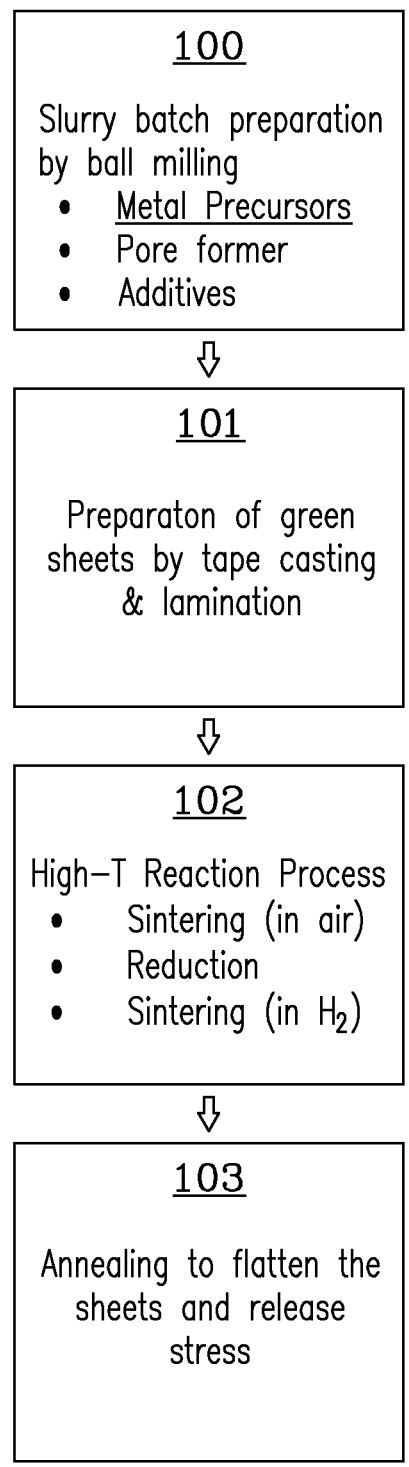
FIG. 1 is a block diagram depicting a process for making thin, porous metal sheets according to one embodiment of the present invention.

FIGS. 1-17 show a variety of embodiments of the present invention. Referring first to FIG. 1, major process steps used in one embodiment for preparation of porous metal sheets are depicted by a block diagram. First, a batch of slurry is prepared 100 by mixing a metal precursor, a pore former, and some additives with a solvent. The homogenous slurry is then casted 101 into sheets of desired dimensions using, for example, a tapecasting technique. In some instances, two or more of the casted sheets may be laminated into a single green laminate. Lamination of multiple green body sheets can be used to produce thick sheets and/or particular cross-sectional composition profiles.

The green body sheet or laminate is subsequently treated 102 under high-temperature reaction conditions. In this process step, removal of all the pore former and organic additives, conversion of the metal precursor into the desired metallic phase, and formation of pore structures can occur concomitantly. Finally, the raw porous metal sheet is annealed 103 under suitable gas environment and conditions and its surface is smoothened at the same time.

The fabrication process described herein allows decoupling of the material forming process at atomic, nano-, micro-, and macro-scales by optimizing and controlling individual process steps. For example, chemical compositions of the final porous metal sheets can be controlled by the slurry batch composition, while its metallic crystalline phase and pore structure can be substantially controlled through the reaction conditions. The pore size of the final product can be controlled by the sizes of the metal oxide precursor particles and the pore formers, while the porosity can be determined by the pore former loading and sintering conditions.

EXAMPLE

Slurry Preparation

Slurry preparation can depend on the desired composition for the resultant metal sheet. In one example, NiO powder was combined with a mixture of 80% Methyl Ethyl Ketone (MEK) and 20% Ethanol solvents (volume ratio), Witco Emphos PS-236® dispersant, Solutia Butvar B-79® PolyVinylButyral (PVB) binder, and Alfa Aesar® BenzylButylPhthalate (BBP) plasticizer. In addition, Cancarb Ultra Pure N990® Carbon Black, or Asbury Graphite #4006® was added as a pore former.

A batch container is filled with an appropriate amount of zirconia milling media e.g., ⅜" diameter barrel media). The amount of media used is dependent on the size of the container. The solvents and dispersant are added into the batch container and mixed. Then, the pore former is added to the container and the container is capped and shaken to let the pore former powder be coated with the solvent/dispersant mixture so that soft agglomerates of the high surface area material are quickly broken. Next, the metal precursor powder (NiO) is added, and the container is capped, shaken, and placed on a ball mill for a minimum of 10 hours. Typically, long milling time and high speed would aid break-up of agglomerates of the pore former and NiO powder. The binder and plasticizer can then be added, followed by mixing at a relatively slower speed for a minimum of 4 hours. The binder tends to increase the viscosity of the slurry and thus, a slower speed is needed to allow proper mixing. Once the slurry is suitably mixed, it is moved to a stow roller and allowed to roll at a speed that facilitates removal of trapped air bubbles from the slurry before casting. The slow rolling of the slurry is kept for a minimum of 2 hours before casting.

The slurry batch preparation can directly affect the ability to conduct tape casting. Its composition and uniformity determine the crystal phase composition and uniformity of pore structures in the final product, respectively. In the instant example, nickel oxide is used as the Ni precursor material. Graphite and carbon black particles were evaluated as the pore forming material. For a given loading of NiO and pore former, properties of the slurry can be adjusted by use of solvent, dispersing agent, binder, and plasticizer. Tables 1a and 1b summarize the batch compositions evaluated in this work for preparation of porous Ni sheets.

TABLE 1a

Slurry batch compositions for porous Ni preparation

| ID # | 1 | 2 | 3 | 4 | 5 | 6 | 7 |
|---|---|---|---|---|---|---|---|
| Pore former, vol. % | 0 | 20% | 0 | 20% | 20% | 20% | 20% |
| Solids, vol. % | 17% | 16% | 17% | 16% | 16% | 20% | 24% |
| Slurry vol., ml | 50 | 70 | 50 | 70 | 70 | 70 | 150 |
| Composition, wt. % | | | | | | | |
| NiO | 60.3% | 52.9% | 61.8% | 52.9% | 53.0% | 58.2% | 63.0% |
| Pore former | 0.0% | 3.5% | 0.0% | 3.5% | 3.6% | 3.9% | 4.2% |
| Ethanol | 6.0% | 6.6% | 5.6% | 6.6% | 6.7% | 5.6% | 4.6% |
| MEK | 24.6% | 27.0% | 23.2% | 27.0% | 27.3% | 22.8% | 19.0% |
| PS-236 (Dispersant) | 0.6% | 0.5% | 0.6% | 0.5% | 0.5% | 0.6% | 0.6% |
| PVB-79 (Binder) | 5.1% | 5.6% | 5.3% | 5.6% | 5.4% | 5.3% | 5.1% |
| BBP (plasticizer) | 0.0% | 3.8% | 3.6% | 3.8% | 3.6% | 3.6% | 3.5% |
| DBP | 3.3% | 0.0% | 0.0% | 0.0% | 0.0% | 0.0% | 0.0% |
| Total | 100% | 100% | 100% | 100% | 100% | 100% | 100% |
| Pore former | Graphite | Carbon Black | Graphite | Carbon Black | Carbon Black | Carbon Black | Carbon Black |
| NiO solid | as received | as received | as received | Milled | Milled | Milled | Milled |

Notes of different batch#
1. PVB-based batch, starting trial
2. 20 vol % pore former
3. Same as #1 except for using BBP instead of DBP.
4. Same as #2 except for attrition milling of NiO. The cast tape was very sticky and difficult for lamination, as the tape tended to be self-laminated upon contact.
5. Based on #4 but the (binder + plasticizer) to solvent ratio, B + P/S, was lowered due to sticky tape after casting.
6. Based on #5. The B + P/S ratio was further lowered because the cast tape was still sticky. The solid to the solvent loading ratio (SSL) was also increased to keep the viscosity similar. The modified batch became significantly less plastic with a higher solids loading. It was easier to do tape casting and lamination became less problematic.
7. Batch was further modified to become significantly less plastic with a higher solid loading. This was a standardized batch composition used for the sintering and reduction processing route.

TABLE 1b

Slurry batch compositions for porous Ni preparation

| ID# | 8 | 9 | 10 | 11 | 12 | 13 | 14 |
|---|---|---|---|---|---|---|---|
| Pore former, vol. % | 0 | 40% | 60% | 80% | 40% | 60% | 60% |
| Solids, vol. % | 24% | 24% | 24% | 24% | 27% | 27% | 27% |
| Slurry vol., ml | 70.0 | 70.00 | 70.0 | 70.0 | 51.7 | 55.6 | 55.6 |
| Composition, wt. % | | | | | | | |
| NiO | 70.5% | 53.4% | 41.1% | 24.2% | 55.9% | 43.2% | 43.3% |
| Pore former | 0.0% | 9.6% | 16.6% | 26.0% | 10.0% | 17.4% | 17.4% |
| IPA (2-Propanol) | 0.0% | 0.0% | 0.0% | 0.0% | 0.0% | 0.0% | 0.0% |

TABLE 1b-continued

Slurry batch compositions for porous Ni preparation

| ID# | 8 | 9 | 10 | 11 | 12 | 13 | 14 |
|---|---|---|---|---|---|---|---|
| Ethanol | 4.2% | 5.2% | 6.2% | 7.3% | 4.8% | 5.5% | 5.6% |
| MEK | 17.0% | 21.5% | 25.5% | 30.0% | 19.5% | 22.6% | 22.9% |
| PS-236 (Dispersant) | 0.7% | 0.6% | 0.6% | 0.5% | 0.6% | 0.6% | 0.6% |
| PVB-79 (Binder) | 4.6% | 5.8% | 6.0% | 7.1% | 5.5% | 6.4% | 6.1% |
| BBP (plasticizer) | 3.1% | 3.9% | 4.1% | 4.8% | 3.7% | 4.3% | 4.2% |
| DBP | 0 | 0 | 0 | 0 | 0 | 0 | 0 |
| Total | 100% | 100% | 100% | 100% | 100% | 100% | 100% |
| Pore former material | same | same | same | same | same | same | same |
| NiO solid (Baker) | milled | milled | milled | milled | milled | milled | milled |

Notes of different batch#
8. Based on #7 but Carbon Black was not used for trials without a pore former.
9. Based on #7 but the carbon black pore former was increased to 40 vol. %.
10. Based on #7 but the pore former was increased to 60 vol. % and the B + P/S number was reduced due to stickiness of the cast tape.
11. Based on #10 but the pore former was increased to 80 vol. %.
12. Based on #9 but the B + P/S ratio was decreased and the SSL number was increased in order to reduce stickiness of the cast tape.
13. Based on #10 but the B + P/S ratio was decreased and the SSL number was increased in order to reduce stickiness of the cast tape.
14. Based on #13 but the B + P/S ratio was further decreased to reduce stickiness of the cast tape. This was a standardized batch composition used for the direct reduction processing route.

EXAMPLE

Tape Casting and Lamination

Tape casting can be accomplished using a doctor blade. The doctor blade is used to pull a uniform thickness of material out onto a carrier film. Silicone coated Mylar is but one example of a carrier film. The resulting tape is allowed to dry before being removed from the caster, but remains attached to the carrier film. The tape was then allowed to dry in air overnight to remove residual solvent before further processing.

Once dried, the tape was cut into pieces of desired sizes for lamination. The cut pieces can be removed from the original carrier film and placed onto fresh silicone-coated Mylar. The first laminate layer would be placed with the "cast side" facing away from the Mylar. The second layer was placed "cast side" facing toward the first layer ("cast sides together"). The "cast side" of the tape is defined as the side that was toward the carrier film, white the "air side" of the tape is the side away from the carrier film during casting and drying. The "cast side" surface was much smoother than the "air side." If thicker samples were required, more than two layers of tape were stacked appropriately to create a laminate that was "symmetric", i.e. identical from the center to either side. To do this, the tapes would be stacked "air side" to "cast side" from the outside to the center, with the two layers in the center having "cast sides together" and an identical number of sheets from the center to either top or bottom edge.

After all the required layers were stacked, the top layer was covered with another piece of fresh silicone-coated Mylar. Then, the entire lay-up would be placed on a sheet of ⅛ inch thick silicone rubber, and inserted into a vacuum bagger to remove any air trapped between layers and to stabilize the lay-up by inhibiting the ability of layers to shift around during lamination. A hot roll laminator was used for lamination, with top and bottom roll temperatures all set at 275° F. and the speed set to ~0.75 of the scale. The NIP pressure was set at 40 psi. Each lay-up would be passed through the laminator three times under these conditions, and then removed from the vacuum bag.

The slurry needs to be prepared in such a way that a uniform sheet is readily casted and the dried sheet can be easily taken off from the carrier film. The uniformity means that the sheet thickness is uniform over the whole sheet and the composition along the thickness of the sheet is uniform. Thus, the slurry should be neither too dilute nor too viscous. Addition of some pore forming material was significant in making a porous metal sheet of adequate porosity for membrane applications (30 to 60%). Use of graphite particles as the pore former resulted in large and non-uniform pore structures due to the plate-like morphology of graphite. During tape casting, these plates tend to orient in the direction of the cast and leave bands of pores through the thickness of the final piece it was found later that uniform pore structures of mean pore size around micrometer were obtained using carbon black as a pore former.

Figure 2:
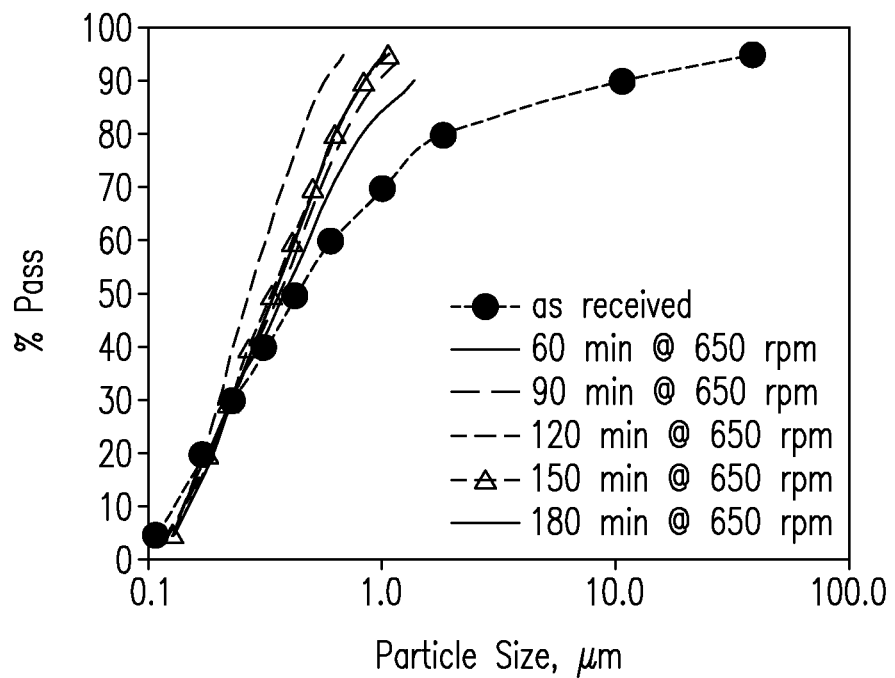
FIG. 2 is a graph showing the impact of milling conditions on particle size for one particular metal precursor.

The NiO particle size has a significant impact on the uniformity of pore structures in the final product. FIG. 2 shows that above 30% of the NiO in the as-received sample has particle sizes above one micrometer. Some fraction (~10%) of particles even has size above 10 μm. Since the thickness of the tape-cast film was typically about 25 μm in our experiments, presence of such large NiO agglomerates would result in defects of the cast film and final product. Thus, preferably, the as received NiO powder is attrition milled. The large agglomerates above 1 μm size were completely eliminated by the milling. The optimum milling conditions appeared to be 120 min at 650 rpm. Thus, the milled NiO was used in the subsequent experimental trials.

EXAMPLE

Sintering and Reduction of the Green Body Sheets/Laminate

After the desired material has been cast and laminated to form the green body sheet, the sheet needs to be converted and sintered into a cohesive, monolithic structure containing substantially only the metal oxide. Sintering can be highly exothermic, as it removes all organic materials contained in the green body sheet. The reaction conditions should be well controlled in such a way that the sheet structure is still intact after the significant changes in the chemical composition and physical structure. The green sheet may not sinter properly or even be turned into powder/small fragments if the reaction process is not controlled well. The temperature and gas environment are critical conditions to control this process step. The green sheet was placed inside a high temperature box furnace with moly disilicide heating elements in a configuration that allowed for uniform temperature and gas profile. This enabled the reaction to occur uniformly over the entire sheet. A dilute $O_2/N_2$ gas stream, such as 2% $O_2/N_2$, is preferred to maintain control of the oxidation reaction. A typical temperature profile used in the oxidation/sintering process is listed in Table 2, The temperature is gradually raised from ambient to a high temperature with several holds along the way to allow controlled removal of organic compounds. The removal of the residual solvent and organic material was completed mostly at tow and moderate temperatures (<600° C.), white sintering occurred at high temperatures (>1000° C.). The metal oxide powder has to be sintered to an appropriate temperature to maintain it in the sheet form. Without adequate sintering, a loose powder can form instead of a sheet. If the sheet is over sintered, however, the porosity and pore size of the final porous metal sheet may be reduced.

TABLE 2

Typical temperature profiles used in oxidation and reduction process steps

| | Oxidation step | | | | Reduction step | | | |
|---|---|---|---|---|---|---|---|---|
| Segment | Start °C. | End °C. | Ramp °C./mm | Duration h | Start °C. | End °C. | Ramp °C./min | Duration h |
| 1 | 20 | 190 | 0.5 | 5.67 | 20 | 300 | 3.0 | 1.6 |
| 2 | 190 | 190 | 0 | 2.00 | 300 | 450 | 0.5 | 5.0 |
| 3 | 190 | 400 | 0.5 | 7.00 | 450 | 450 | 0 | 5.0 |
| 4 | 400 | 400 | 0 | 1.00 | 450 | 800 | 3.0 | 1.9 |
| 5 | 400 | 1375 | 3 | 5.42 | 800 | 800 | 0 | 1 |
| 6 | 1375 | 1375 | 0 | 1.00 | 800 | 20 | 5 | 2.6 |
| 7 | 1375 | 20 | 5 | 4.52 | | | | |
| Total, h | | | | 26.6 | Total, h | | | 17.1 |

The sintered metal oxide sheet derived from the above process step can be converted into the desired metallic crystal phase by a subsequent reduction step. Typically, the pore structure is finalized at the same time. Accordingly, the sintered sheet is placed inside a tube furnace or other atmosphere-controlled furnace. The gas environment and temperature profile are critical conditions that determine formation of the metallic crystal phase and porous structure. For reduction of the sintered sheet, exemplary gases can include, but are not limited to, hydrogen, carbon monoxide, syngas gas, and natural gas. The temperature is raised gradually to the target temperature with multiple holds to maintain control of the reduction process. Under the reduction temperature profile listed in Table 2, metallic structures are also sintered along with the reduction. The reduction converts the metal oxide or metal precursor into a metallic phase, while the sintering allows bonding of the metallic crystals/grains to obtain a mechanically strong structure. The reduction and sintering is usually conducted at low and high temperatures, respectively. For preparation of porous Ni sheets from NiO precursor, a reduction temperature around 400° C. is adequate for conversion, while a sintering temperature around 800° C. is preferred.

A 50 μm-thick green body laminate sheet was made by lamination of two tape-cast films of about 25 μm thick. This helped to minimize the composition gradient that could be caused b the sedimentation during the casting process step. The green sheet looked like apiece of black-colored paper, uniform, flat, self-supported. After sintering at 1375° C. in 2% $O_2/N_2$ gas environment, the green sheet was transformed into a greenish NiO sheet with some amount of porosity. The sintered sheet was very weak and could not be self supported. It was moved into a hydrogen furnace on an alumina plate. The NiO was converted into a metallic form by reduction in $H_2$ gas at 400° C. and sintering at 800° C. The resulting raw porous metal sheet was strong. However, some wrinkles were created by the reduction process. The porous metal sheet was made flat and smooth after annealing/flattening, which is described below in further detail.

Figure 3:
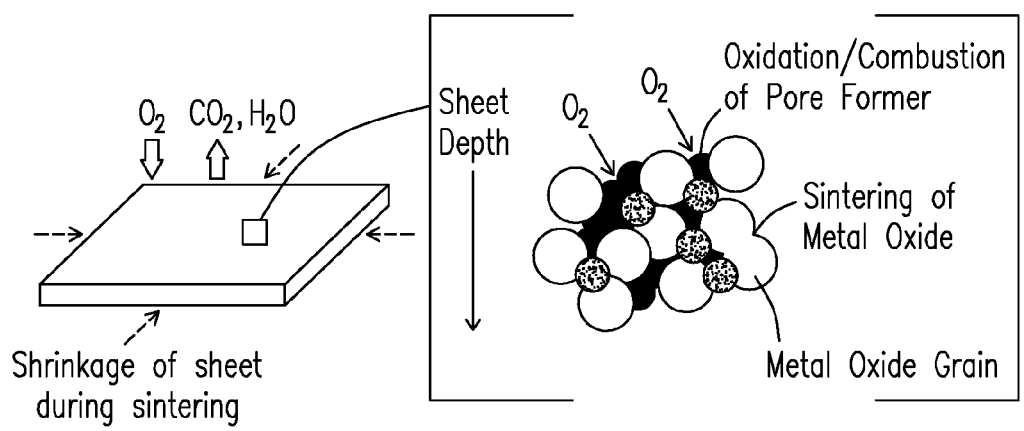
FIG. 3 is a schematic diagram depicting a possible sintering mechanism according to some aspects of the present invention.
Figure 4:
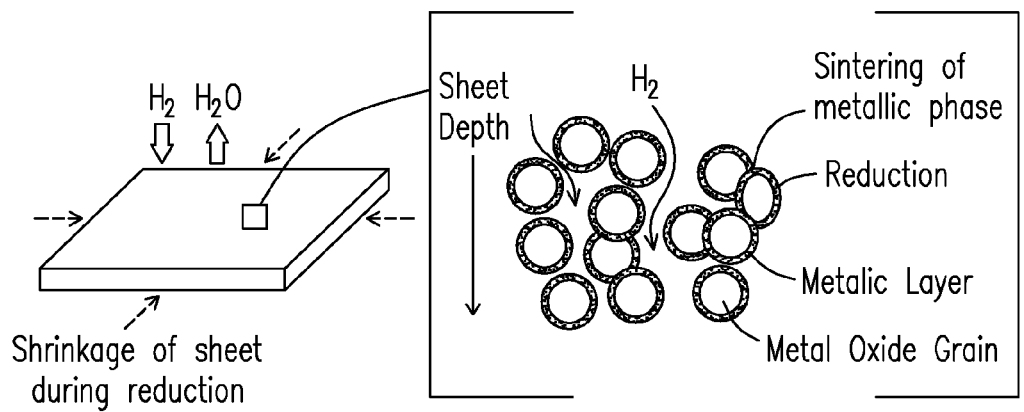
FIG. 4 is a schematic diagram depicting a possible reduction mechanism according to some aspects of the present invention.

The proposed reaction mechanisms for the sintering and reduction process steps are illustrated in FIGS. 3 and 4, respectively. In the sintering step (referring to FIG. 3), the pore former is removed by oxidation/combustion reactions, while the metal oxide grains are sintered together to form a continuous skeleton. The oxidation of the pore former and NiO sintering are conducted concomitantly in three-directional body of the green sheet. The sheet typically shrinks during the process as the pore former is volatilized and the metal oxide grains are sintered. Thus, there is a dramatic change in the sheet chemical composition and physical properties, and significant amount of stress can be developed during the process. The green sheet needs to be carefully set up in the furnace to generate uniform temperature distribution and uniform oxygen gas environment so that the gas/solid and solid/solid reactions proceed uniformly throughout the whole body of the green sheet. In this way, stress is minimized to keep the sheet flat and uniform after sintering. Oxidation of organics is highly exothermic. If the reaction is not controlled well, the green sheet can be severely compromised, to the point that particle-particle contact is eliminated and all that remains after sintering is NiO powder.

In the reduction step (referring to FIG. 4), the metal oxide is reduced into metal, and the metallic grains are sintered to form a continuous metallic skeleton. Reactions and mass transport processes in all the scales (whole sheet, individual grain, metal/metal oxide interface) need to be taken into account to obtain a uniformly porous structure in three dimensions. The reaction conditions need to be controlled in such a way that gas/solid and solid/solid reactions occur uniformly throughout the process. At the metal/oxide interface, metal oxide grain may not be fully reduced if the reduced layer becomes dense rapidly and $H_2$ gas diffusion is blocked. At the scale of individual grains, the metal oxide grain in interior of the oxidized sheet may not be reduced if the external surface is rapidly reduced and sintered such that $H_2$ diffusion into the interior of the sheet body is blocked. Similar to the sintering process step, the reduction process induces dramatic changes in the chemical and physical properties of the sheet. There is significant shrinkage in the sheet size. Significant amounts of stress can be developed during the process, which can cause defects and serious failures, such as, wrinkles, cracks, curling, holes, fragmentation, etc., which could not be repaired by the post treatment. The sheet setup and reaction conditions in the furnace need to be carefully controlled so that the reduction can occur uniformly over the whole sheet.

Loading of the pore former in the slurry batch is found to be an important parameter that affects the processing and final product pore structure. Impacts of the pore former loading on morphologies of the sintered and reduced sheet can vary. A number of parts were produced using the same procedure and conditions except the green sheets were formed with slurries of different pore former loadings. The sintered and reduced sheets of a 40 vol.% pore former loading look similar to those of a 20 vol % pore former loading. The part looked extremely flat after sintering, and shiny and smooth after annealing. The sintered sheet from a 60% pore former loading looked fairly flat but was very fragile. The reduced part still showed very smooth surface but looked not as shiny as the ones of lower pore former loading. When 80 vol % pore former was used, the part simply could not stay as a continuous, whole sheet after sintering. The part did not show any strength for handling. At such high pore former loading, the NiO particles could no longer be sintered together to form a continuous structure.

Figure 5A:
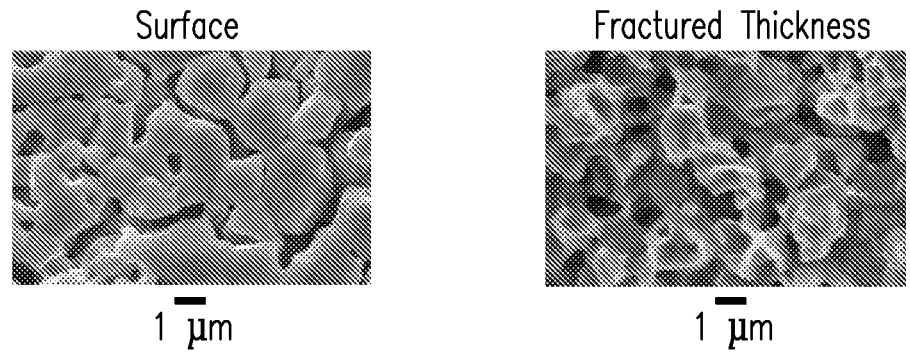
FIG. 5 includes micrographs displaying textures and microstructures of various porous Ni sheets prepared according to embodiments of the present invention.
Figure 5B:
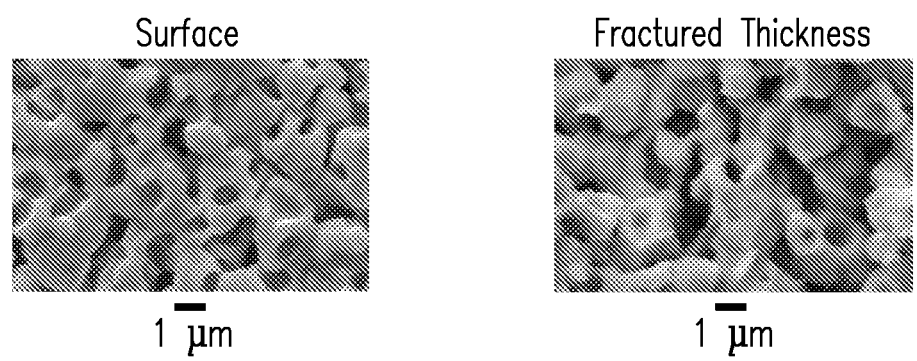
Figure 5C:
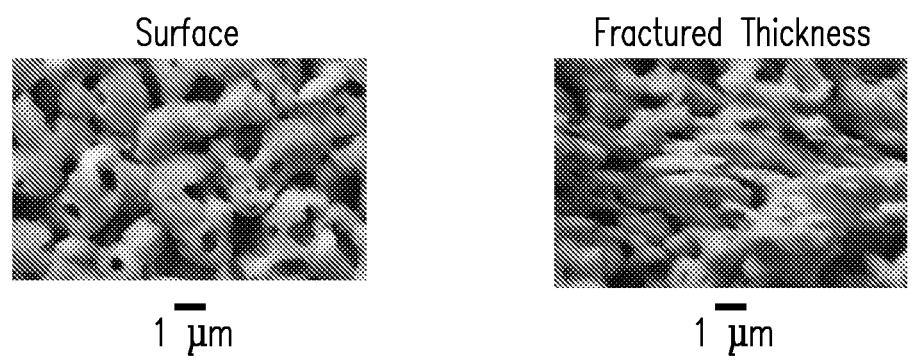

The microstructures of the final sheets derived from different pore former loadings are compared in FIG. 5. In particular, the pore former loadings for FIGS. 5A1 and 5A2 are 20%, for FIGS. 5B1 and 5B2 are 40%, and for FIGS. 5C1 and 5C2 are 60%. The micrographs on the left and right columns of FIG. 5 show microstructures of the exterior surface and the fractured thickness of a sheet, respectively. The fractured thickness reflects the interior structure. The SEM pictures of the fractured thickness in FIG. 5 are representative structures obtained by examining the whole thickness from the top to bottom surface of the sheet. The surface porosity is increased by using high pore former loading. At 60% pore former loading, two kinds of pores appear. The pores formed between the sintered metal grains are in the micrometer level, while the pores existing on a sintered particle/grain are smaller and vary significantly in size at different spots. The interior of the sheet looks more porous than the exterior, particularly for the sheet derived from 20 vol % pore former. However, this may be partly due to grain pull-out due to the fracture of the sheet.

Figure 6:
FIG. 6 includes micrographs displaying textures and microstructures of various porous Ni sheets prepared according to embodiments of the present invention.

Fabrication of porous metal sheets at thickness of 25, 50, and 200 μm has been demonstrated with this processing route. The tape-cast films were made of the same slurry batch and laminated into the green sheet of the targeted thickness. The green sheet of different thickness was sintered, reduced, and annealed by using the same procedure and conditions. FIG. 6 compares textures and microstructures of porous Ni sheets of different thicknesses (using the sintering/reduction processing route and a slurry batch of 20% pore former) and shows that the resulting sheet has uniform pore structures along its thickness. The interior structures for these three sheets of different thickness look similar, and highly porous. However, the surface porosity seems to increase with decreasing sheet thickness.

High quality porous Ni sheets can be consistently produced according to the methods described herein. Table 3 shows that the sheets made by three repeated sintering/reduction runs of identical green sheets containing 40 vol % pore former (Batch #9 in Table 1b) have similar porosity around 50%. This slurry batch was modified by slightly increasing NiO loading and decreasing content of the solvent and dispersant to improve the tape casting process step. The green sheet of the modified batch composition (Batch #12 in Table 1b) is converted into the porous metal sheet product by using the same sintering/reduction procedure and conditions. Three repeated runs also yielded product sheets of consistent quality with the porosity around 50%.

TABLE 3

Porosity of multiple porous Ni sheets (50 μm thick) prepared through sintering/reduction route (slurry batch of 40% pore former)

| Batch# ID | Sample# | Density, g/cc | Porosity |
|---|---|---|---|
| #9 | 1 | 4.71 | 0.47 |
|  | 2 | 4.57 | 0.51 |
|  | 3 | 4.45 | 0.51 |
| #12 | 1 | 4.51 | 0.50 |
|  | 2 | 4.40 | 0.52 |
|  | 3 | 4.66 | 0.48 |

EXAMPLE

Direct Conversion of Green Body Sheets Into Porous Metal Sheets

The sintering/reduction route involves two different kinds of high-temperature reaction processes, which will add capital cost and process complexity in a practical manufacturing process. In contrast to the two-step sintering and reduction process described above, direct conversion of the green body sheets into porous metal sheets can be achieved by treating the green body sheet using a single process step with particular gas environments and temperatures. Unexpectedly, a significant fraction of organic materials in the green body sheet can serve as an in situ reducing agent for conversion of the metal oxide precursor into a metallic state. Substantially pure $H_2$ is the preferred gas environment. An exemplary temperature profile is summarized in Table 4.

TABLE 4

Typical temperature profiles used in direct reduction processing route

| Segment | Start ° C. | End ° C. | Ramp ° C./min | Duration h |
|---|---|---|---|---|
| 1 | 20 | 190 | 1.0 | 2.8 |
| 2 | 190 | 190 | 0 | 2.0 |
| 3 | 190 | 400 | 1.0 | 3.5 |
| 4 | 400 | 400 | 0 | 5.0 |
| 5 | 400 | 800 | 1.0 | 6.7 |
| 6 | 800 | 800 | 0 | 1.0 |
| 7 | 800 | 20 | 5.0 | 2.6 |
| Total |  |  |  | 23.6 |

Figure 7:
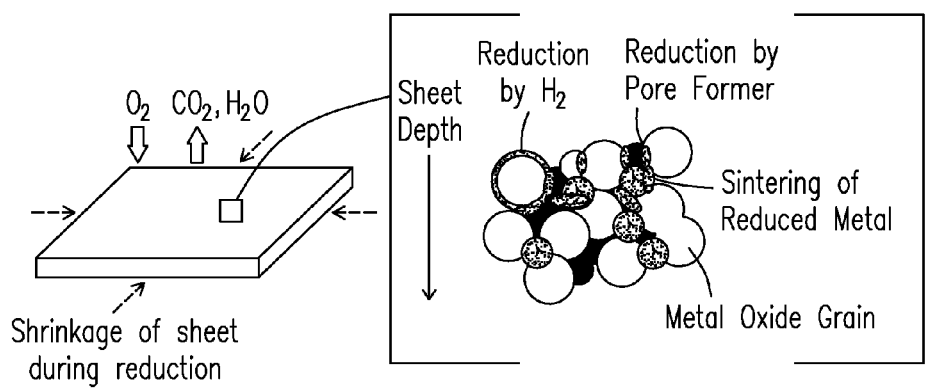
FIG. 7 is a schematic diagram depicting a possible reaction mechanism for one embodiment of the present invention.

Proposed reaction mechanisms are illustrated in FIG. 7 for direct reduction of a green sheet into a porous metal sheet. The organic pore former in the green sheet may act as a reducing agent to the metal oxide or metal precursor. Thus, removal of the pore former, reduction of the metal oxide into metal, and sintering of the metallic grains can be conducted in one step.

Figure 8:
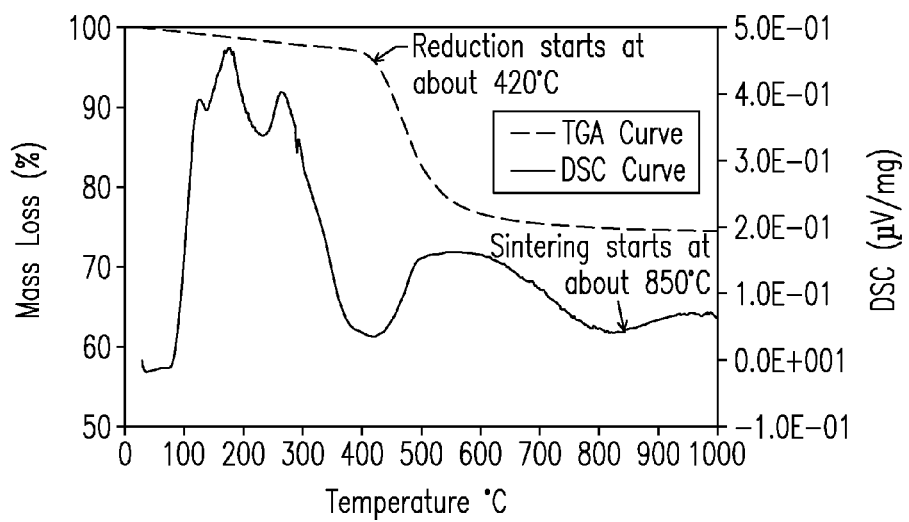
FIG. 8 is a graph summarizing TGA/DSC measurements from one embodiment of the present invention.

The reduction characteristic of a green sheet was surveyed by temperature-programmed reduction measurement on a DSC/TGA apparatus. A small chip of a green sheet weighing about 20 mg was heated in 2.75% $H_2$/He gas stream by raising the temperature at a ramp rate of 2.4° C./min. FIG. 8 shows the weight loss and thermal flux profiles. The weight loss at low temperatures may be due to decomposition and vaporization of the organic additives. The NiO reduction starts at about 400° C. The reduction is substantially completed at 600 to 700° C. At about 850° C., the reduced metallic Ni starts sintering.

Direct reduction trials were carried out by using three green sheets made of different pore former loadings. The sheets were loaded inside a 3" diameter tube furnace and reduced in a 40% $H_2/N_2$ gas flow. The morphologies of parts reduced at two different temperature profiles were compared. The low-temperature and high-temperature profiles correspond to holding for 2-h at 650° C. and 1-h at 800° C., respectively. The green sheets of 20 and 40 vol % pore former loading were reduced into a metallic state by the low-temperature reduction. The resulting porosity was about 19% for the 20% pore former and 38% for the 40% pore former. However, the green sheet of the 60 vol. % pore former could not be completely converted into a metallic state by the low-temperature reduction. The porosity of the resulting fragments was about 65%. This indicates that reduction temperature of 650° C. may be too low to allow sintering of the reduced Ni grains.

Figure 9A:
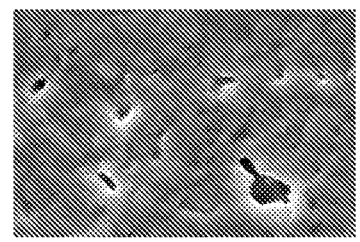
FIG. 9 includes micrographs displaying surface textures of several embodiments of the present invention.
Figure 9B:
Figure 9C:

By contrast, all three green sheets were converted into the metallic state by the high-temperature reduction. The porosity of the reduced part is 3.5%, 19%, and 50% for the 20%, 40% and 60% pore former, respectively. The surface of these three reduced samples are shown in FIGS. 9a, 9b, and 9c, respectively. Significant densification occurred for the green sheets of 20% and 40% pore former after the reduction treatment at 800° C., which is consistent with the porosity measurement. Such porosity level is too low to be an effective membrane support. Unexpectedly, the 60% pore former part comprises a continuous, porous structure after the high-temperature reduction. The part appeared mechanically strong and had porosity of 50%, which is suitable for membrane support applications.

The direct reduction process was very repeatable. With the same green sheet of the 60% pore former, the porous metal sheets of same quality of porosity around 54% were produced by three repeated reduction runs (Table 5). The porosity was reduced to about 36% when the reduction was held at 800° C. for 2 h instead of 1 h.

TABLE 5

Porosity of multiple Ni sheets (50 µm thick) prepared through direct reduction route (Batch #14, 60% pore former)

| Reduction conditions | Sample# | Density, g/cc | Porosity |
|---|---|---|---|
| 1 h at 800° C. | 1 | 4.40 | 0.52 |
| | 2 | 3.99 | 0.56 |
| | 3 | 4.02 | 0.54 |
| 2 h at 800° C. | 1 | 5.74 | 0.38 |
| | 2 | 5.98 | 0.35 |

Figure 10:
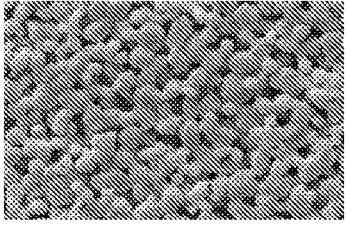
FIG. 10 includes micrographs comparing various Ni sheets prepared according to embodiments of the present invention.
Figure 10:
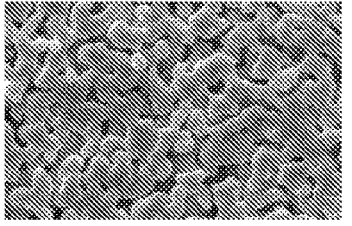
Figure 10:
Figure 10:
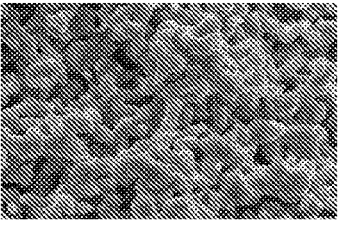
Figure 11A:
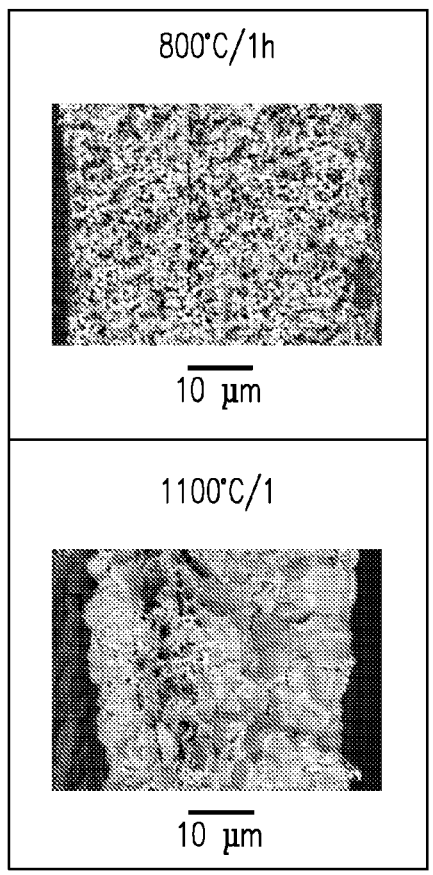
FIG. 11 includes micrographs composition summaries for some Ni alloy sheets according to embodiments of the present invention.
Figure 11B:
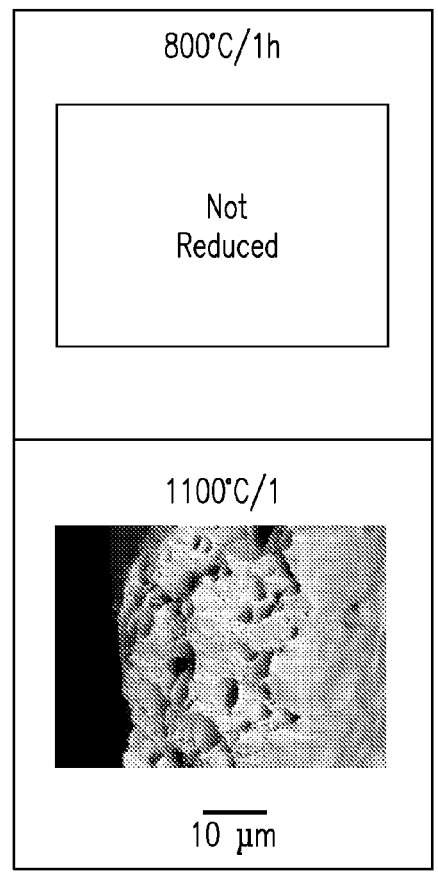
Figure 11C:
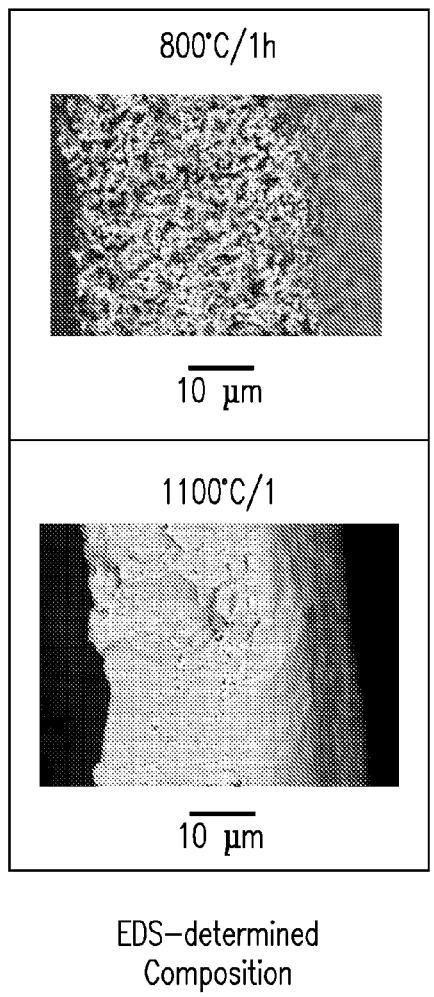
Figure 11D:
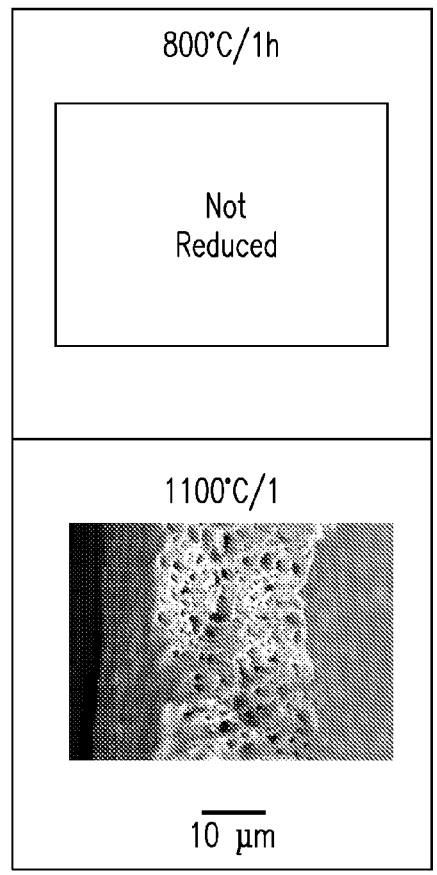

The porous metal sheet produced by direct reduction is compared to the one produced by sintering/reduction. The same green sheet of the 60% pore former and the same annealing conditions were used. FIG. 10 shows the exterior surface and fractured thickness structures of the final product sheets produced by the two different conversion routes. First, both sheets are highly porous and have uniform pore structures on the surface and across the sheet thickness. The sheet produced by the sintering/reduction has some smaller holes distributed on the solid phase in addition to pores formed among the solid grains. These holes may be formed from removal of the pore former embedded into the metal oxide agglomerates during the sintering process. The porosity numbers of the porous metal sheets are listed in Table 6. The direct reduction resulted in a porous sheet of slightly higher porosity than the sintering/reduction. This may be caused by significant sintering of NiO particles during the sintering process of the green sheet of such a high pore former loading. The porosity numbers measured based on the Volumetric density is close to those measured based on Archimedes density.

TABLE 6

Impact of two different conversion routes on porosity of final porous Ni sheet product (50 µm thick; same batch composition, #11 with 60% pore former)

| Conversion process | Porosity based on Volumetric density | Porosity based on Archimedes density |
|---|---|---|
| Sintering and reduction | 46.8 | 48.0% |
| Direction reduction | 53.2 | 55.5% |

EXAMPLE

Annealing and Flattening

Porous metal sheets produced by the above high-temperature reaction processes are often associated with some wrinkles and/or patterns, especially near the edges. The sheets can be annealed and flattened at the same time to obtain a strong, uniform porous metal sheet with minimal surface variations. In particular, a load is applied to the porous metal sheet against a smooth surface at elevated temperatures. A reducing gas environment is preferred to avoid re-oxidation of the metallic state. The temperature should be less than or approximately equal to the softening point of the porous metal sheet. However, the temperature must to be low enough to avoid excessive sintering or melting of the porous structure.

The sintered and reduced metal sheet can be placed in a vacuum/controlled atmosphere hot press furnace; the furnace was flushed with Argon three times to purge out residual oxygen in the furnace; the flushing was done by pulling vacuum to 0.1 torr and back-filling the furnace with Argon gas back to atmospheric pressure; then, the furnace was pulled to 0.1 torr and back-filled with 3.0% $H_2$/Ar to 2-3 psi positive pressure. This pressure was maintained in the furnace through the entire run; the furnace was heated 5° C./min from room temperature to 800° C. A load was gradually applied immediately upon reaching hold temperature of 800° C. The initial load of 10 psig (~7.85 psi on sample) was increased to 50 psig (~39.27 psi on sample) after 10 minutes elapsed from initial application of the load. After 20 minutes of elapsed time, the load was increased to 100 psig (~78.52 psi on sample). The load was again increased to 130 psig (~102.08 psi on sample) after 30 min elapsed time and was maintained for approximately 1.5 hours at maximum pressure. The temperature was then reduced by 5° C./min. The load was removed from the sample after the furnace was cooled to roughly 500° C. to prevent formation of defects from thermal stresses being induced, and thus the load pinning the part causing tears in the sheet.

EXAMPLE

Preparation of Metal Precursors for Ni-Based Alloys

Different metal alloys can be prepared with the process steps described herein by using appropriate metal precursor materials. In the instant example, metal oxide composites were prepared to make different Ni-based alloys. The raw materials used in this task include Iron(III) Nitrate nonahydrate (98%, ACS grade, Sigma-Aldrich®), Manganese(II) Nitrate hydrate (98%, Aldrich®), Copper(II) Nitrate hydrate (98%, ACS grade, Sigma Aldrich®), Chromium(III) nitrate nonahydrate (99%, Sigma Aldrich®), Ammonium heptamolybdate tetrahydrate (99.98% metals basis, Sigma Aldrich), Ammonium carbonate (ACS grade, Sigma Aldrich®) Iron(II, III) oxide (99.5%, 325 mesh, NOAH technologies Corporation®), and Iron(III) Nitrate nonahydrate (ACS grade, crystal, NOAH technologies Corporation®). The composite can be prepared by using co-precipitation or impregnation techniques. The two methods are illustrated with preparation of metal oxide composite precursor for low-expansion NiFe alloy.

Co-Precipitation:

376.12 g of the Iron (III) nitrate and 75.42 g of the Nickel (II) nitrate were added into a 2 L flask. A suitable amount of de-ionized water was added to completely dissolve these salts. The resulting solution looked brownish red in color. 2M of the ammonium carbonate solution was added into the solution drop-by-drop to get the precipitate. The precipitate was filtered from the remaining solution. The wet cake was dried at 120° C. Two portions of the dried powder were calcined for 2 h in air at 400° C. and 700° C., respectively. A composite of Ni and Fe metal oxides was obtained after calcinations.

Impregnation:

74.31 g of the Iron (II, III) oxide was transferred into a 250 ml beaker. 236.57 g of the Ni nitrate was added into a 250 ml beaker and dissolved with 100 ml de-ionized water. The solution was added into the iron (II, III) oxide powder drop-wise under stirring. The resulting slurry mixture was heated on the hot plate to get rid of excess water and then dried at 120° C. overnight. Two portions of the dried powder were calcined for 2 h in air at 400° C. and 700° C., respectively. The resulting metal oxide composite looked in gray black color.

TABLE 7

Compositions of four targeted Ni alloys (wt. %)

| Element | NiFe alloy of low expansion | NiCu 400 grade | 304 stainless steel | Magnetic alloy |
|---|---|---|---|---|
| Fe | 52.0% | 2.5% | 74.0% | 20.0% |
| Ni | 48.0% | 65.0% | 8.0% | 75.0% |
| Cu |  | 31.5% |  | 2.5% |
| Mn |  | 1.0% |  |  |
| Cr |  |  | 18.0% |  |
| Mo |  |  |  | 2.5% |

EXAMPLE

Preparation of Porous Sheets with Other Ni-Based Alloys

Porous sheets of Four Ni-based alloys were fabricated, and their nominal compositions are listed in the Table 7. The NiFe is a low expansion alloy and is known for bonding well to glass materials. NiCu alloys are corrosion resistant and have been used to build the oil and gas pipelines. 304 stainless steel is a commonly-used metallic material for appliance and industrial applications. The fourth is a magnetic alloy.

TABLE 8

Amounts of chemicals used to prepare composite metal oxides by co-precipitation method

| | NiFe alloy of low expansion | NiCu 400 grade | 304 stainless steel | Magnetic Alloy |
|---|---|---|---|---|
| Raw materials used for preparation, g | | | | |
| Iron (III) nitrate nonahydrate | 376.21 | 18.08 | 535.38 | 144.69 |
| Ni nitrate hydrate | 75.42 | 320.35 | 12.57 | 117.85 |
| Copper nitrate hydrate |  | 115.30 |  | 9.15 |
| Manganese (II) nitrate hydrate |  | 3.25 |  |  |
| Chromium (III) nitrate nonahydrate |  |  | 138.54 |  |
| Ammonium molybdate tetrahydrate |  |  |  | 8.05 |
| BET surface area of calcined metal oxide composite, $m^2/g$ | | | | |
| 400° C. for 2 hrs | 67.3 | | | |
| 700° C. for 2 hrs | 4.92 | 9.15 | 9.00 | |

Co-precipitation and impregnation methods were evaluated for preparation of each metal oxide composite from individual compounds (or materials). Table 8 lists amounts of the raw materials used for preparation of each respective alloy. The metal oxide composite prepared by co-precipitation was first calcined 400° C. The resulting BET surface was too high to conduct the tapecasting. Next, the precipitate was calcined at 700° C. and the BET surface area was drastically reduced. The raw materials usage for preparation by the impregnation technique is listed in Table 9. The dried sample was calcined at 700° C.

TABLE 9

Amounts of chemicals used to prepare the composite metal oxides by impregnation method

| | NiFe alloy of Low expansion | NiCu 400 grade | 304 stainless steel | Magnetic Alloy |
|---|---|---|---|---|
| Raw materials used for preparation, g | | | | |
| Iron (II, III) oxide | 74.31 | 3.57 | 80.01 | 21.62 |
| Ni(II) hydroxide |  | 102.14 |  | 89.56 |
| Ni nitrate hydrate | 236.57 |  | 30.00 |  |
| Copper nitrate hydrate |  | 115.30 |  | 6.92 |
| Manganese (II) nitrate hydrate |  | 3.25 |  |  |
| Chromium (III) nitrate nonahydrate |  |  | 104.67 |  |
| Ammonium molybdate tetrahydrate |  |  |  | 3.47 |
| BET surface area of calcined metal oxide composite, $m^2/g$ | | | | |
| 700° C. for 2 hrs | 5.76 | 3.698 | 14.4 | 5.93 |

The metal oxide powder made from 700° C.-calcination was used to make the slurry batch with the procedure as used for the NiO batch preparation. The batch composition as listed in Table 10 for the NiFe metal oxide composite prepared by the co-precipitation is also similar to the NiO batch. The batch compositions for the other metal oxide composites are the same. The slurry batch was prepared by a two-stage batching process as described elsewhere herein. The metal oxide, pore former, solvent, and dispersant were mixed first and then, the binder and plasticizer were added. Such a batch composition allowed tape casting of 25 μm-thick green sheet smoothly with the different metal oxide composites listed in Tables 8 and 9. Two of the cast films were laminated into a 50 μm-thick green sheet. The direct reduction approach was tested to convert the green sheet into a porous metallic sheet. Several different reduction temperatures were utilized. Table 11 lists density and porosity numbers of different alloy compositions after reduction. Among seven metal oxide composites tested, only three were converted into a porous metallic form after 1-h reduction at 800° C. in $H_2$. The rest of the samples became fragments, and were not fully reduced. The three metal alloy sheets had fairly good porosity. All the green sheets were converted into a shiny, metallic film after reduction at 1100° C. The thin sheet was so strong that it could not be torn by hand. However, the porosity was reduced to t t an unacceptable level as a membrane support.

TABLE 10

Slurry batch composition of metal oxide composites

| | Mass, g |
|---|---|
| First batching step | |
| NiFe (co-precipitated) | 30.09 |
| CANCARB 990 Carbon Black | 13.38 |
| Ethanol | 4.28 |
| MEK | 17.55 |
| PS-21A | 0.42 |
| Second batching step | |
| Binder | 4.72 |
| BBP | 3.21 |
| Total | 73.64 |

TABLE 11

Density and porosity of Ni-Alloy sheets prepared with different metal oxide composite precursors through direct reduction route

| | 800° C./1 h ($H_2$) | | 1100° C./1 h ($H_2$) | |
|---|---|---|---|---|
| Material | Density, g/cc | Porosity % | Density, g/cc | Porosity % |
| NiFe (cop)[a] | 4.31 | 46.0% | 7.07 | 11% |
| NiFe (imp)[b] | NA | NA | 6.71 | 20% |
| NiCu (imp)[b] | NA | NA | 7.65 | 12% |
| 304 SS (imp)[b] | NA | NA | 6.66 | 17% |
| 304 SS (cop)[a] | NA | NA | 6.74 | 14% |
| Magnetic Alloy (imp)[b] | 3.60 | 56.0% | 7.41 | 15% |
| Magnetic Alloy (cop)[a] | 4.76 | 46.0% | 7.32 | 18% |

[a]Metal oxide composite prepared by the co-precipitation method.
[b]Metal oxide composite prepared by the impregnation method.

The microstructures of all the parts were analyzed by SEM. EDS was used to examine compositions. Results are illustrated in FIG. 11 with a few selected samples. The 1-h reduction at 800° C. in pure $H_2$ was not sufficient to fully reduce the green part, although some metallic-like structures were obtained with the three metal oxide composites. A Reduction temperature of 1100° C. appeared to be too high and most of the porosity was consolidated at this temperature. The co-precipitated samples (i.e., FIGS. 11a, 11c, and 11d) appear to retain individual grain boundaries more than the impregnated one (i.e., FIG. 11b). However, the impregnated sample appears to retain more porosity at 1100° C. Thus, an optimum reduction temperature for those metal alloys is between 800 and 1100° C.

EXAMPLE

Composite Sheets and Graded Structures

Porous sheets comprising ceramics and metal composites as well as sheets having a layered structure can be fabricated according to embodiments of the present invention. Instead of using only reducible metal oxides, some refractory ceramic-type metal oxides can be added into the slurry batch to form a homogenous mixture that is used to form a thin sheet by using the tape casting technique. During reduction of the green sheet, the reducible metal oxide is converted into metallic phases and the ceramic oxides are intact, in this way, a thin, porous metallic/ceramic composite sheet is obtained. In the present example, 5 wt % of yittia-stabilized zirconia (YSZ) powder is added into the NiO slurry batch described above.

The layered sheet structure can be made by lamination of different films in a preferred order. For example, films of different metal oxide compositions/ratios can be laminated together. After reduction and annealing of such a laminated sheet, a porous sheet product of layered structures can be obtained as designed. These features are illustrated by a porous sheet structure in FIG. 12, which was made by laminating tape-casted films in the following order: 20 μm YSZ-50 μm 5% YSZ/Ni-50 μm 5% YSZ/Ni-20 μm YSZ.

Figure 12:
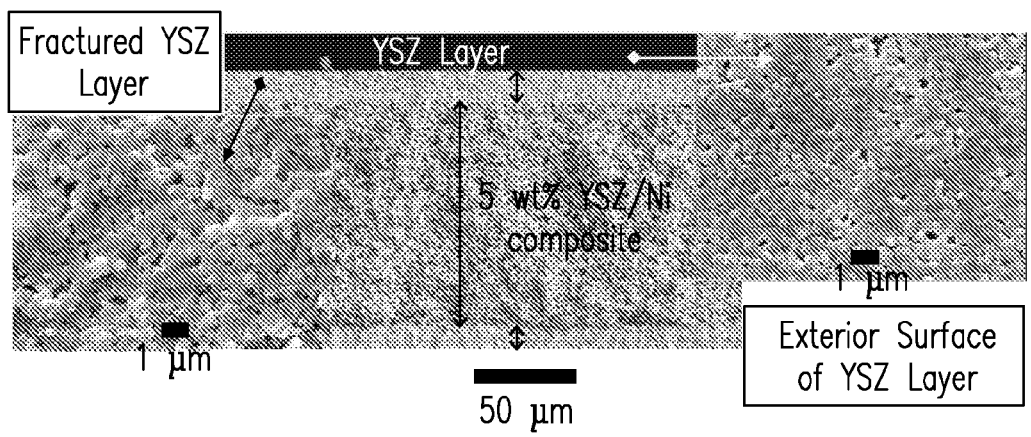
FIG. 12 is a micrograph of a layered structure described by embodiments of the present invention.

A slurry batch was prepared according to the procedures described in the previous sections. The laminated green sheet was treated through the sintering/reduction processing route. The sintering was conducted at 1200° C. for 1 h, while the reduction was carried out at 800° C. for 2 h in 2.75% $H_2$/Ar gas. The NiO was completely reduced into a metallic state while YSZ remained in an oxide form. As shown in FIG. 12, the pore structures of both the core zone (i.e., fractured YSZ layer) and external surface layers are fairly uniform. Since the sintered metallic Ni provides a continuous backbone, the sheet maintains reasonable mechanical strength. If only pure YSZ material was made into such a structure, the sheets were too fragile to even be handled.

Characterization of Porous Ni Metal Sheets

Figures 13A, 13B:
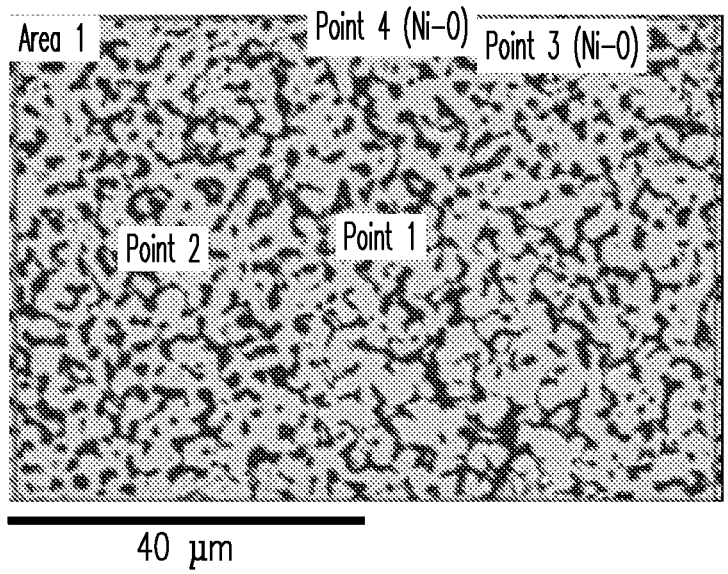
FIG. 13 summarizes SEM/EDS compositional analysis of a porous Ni sheet prepared according to embodiments of the present invention.
Figures 14A, 14B:
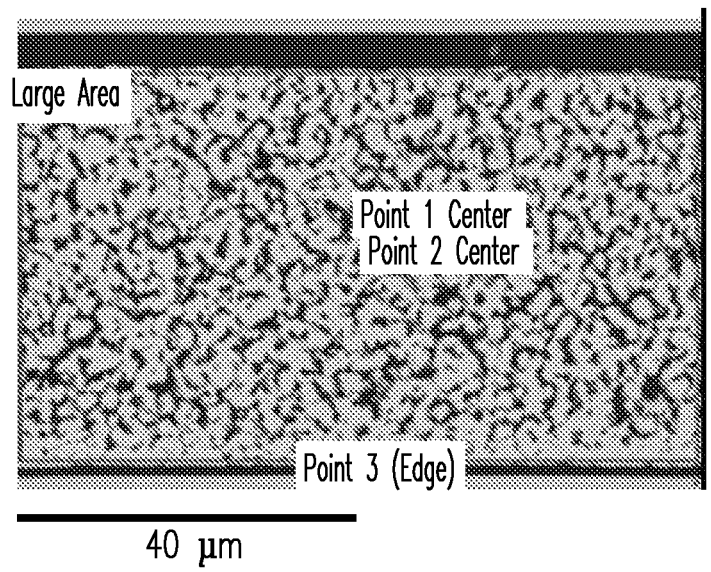
FIG. 14 summarizes SEM/EDS compositional analysis of a porous Ni sheet prepared according to embodiments of the present invention.

Detailed structural analysis was performed on the polished cross-section of porous Ni sheets that were representative of the two different processing routes. FIGS. 13a and 13b show microstructure and atomic compositions, respectively, of a porous Ni sheet (#1) at different locations of its cross-sectional area. This sheet was prepared via the sintering/reduction processing route. The uniform, networked pore structure is evident. Ni is the dominant metal element. Cr and Fe element are impurities. The presence of a minor fraction of oxygen suggests that there might be a thin oxide layer formed on the Ni metal surface. The compositions at two inner points (1 & 2) are consistent with the composition of the whole area. Some isolated, un-reduced NiO particles were identified, which may be caused by inaccessibility of the NiO by $H_2$ gas during the reduction, The microstructure and composition of the porous Ni sheet (#2) prepared by the direct reduction are shown in FIGS. 14a and b, respectively. The sheet looks highly porous. The composition at the inner point is consistent with that of the whole area, Ni is the dominant element. In addition to Cr and Fe impurities, presence of small amounts of Al, Si and Zr was found. These elements likely resulted from contamination during the sample polishing. It is noted that no carbon element and NiO particle were found. Thus, removal of carbon pore former and reduction of NiO were complete with the direct reduction approach.

TABLE 12

XRD peaks and size of Ni crystallite

|  | Commercial dense Ni foil | Porous Ni sheet prepared in this work | |
| --- | --- | --- | --- |
| 2-theta (deg) | Ni201 Size, Å | #1 Size, Å | #2 Size, Å |
| 44.543 (2) | 677 (11) | 570 (6) | 622 (8) |
| 51.8971 (12) | 698 (6) | 562 (7) | 652 (8) |
| 76.3945 (18) | 775 (8) | 689 (8) | 781 (11) |
| 92.935 (2) | 806 (11) | 711 (9) | 844 (12) |
| 98.445 (9) | 869 (58) | 787 (17) | 874 (23) |

The crystal phases of the porous Ni sheets and dense Ni foil were analyzed by XRD (Table 12). Ni metal was the only identifiable crystal phase in those three samples. The Ni crystal size calculated by Sheerer equation is about 570 nm, 622 nm, and 677 nm for the porous sheet #1, porous sheet #2, and dense foil, respectively.

Figure 15:
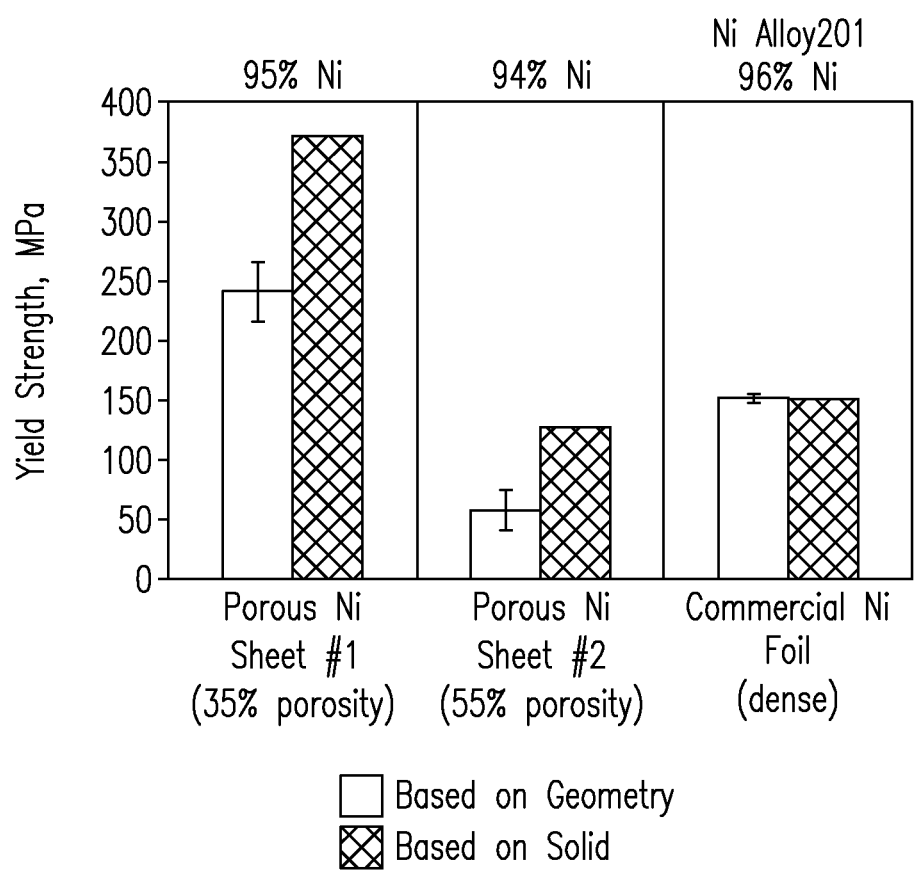
FIG. 15 is a graph comparing yield strength measurements for various Ni metal sheets.

FIG. 15 shows the yield strength of the porous Ni sheets compared to a dense Ni alloy 201 foil of the same thickness. The porous Ni sheet #1 shows average yield strength about four times higher than the porous sheet #2. The high porosity increases the gas permeance but reduces connectivity of the metal grains and strength of the metal sheet. The yield strength of the porous sheet #1 is about 60% and 140% higher than that of the dense Ni foil based on the geometry and solid, respectively.

The porous metal sheet is very flexible upon bending. Its pore structure is also stable under 120 psi compression pressure even at high temperatures (~800° C.). By comparison, the porous ceramic plates and conventional metal foams were easily broken upon bending and the polymeric sheets at such thickness does not self stand and the pore structure is readily deformed by stretching and/or compression.

Thermal stability relative to oxygen oxidation was surveyed by TGA tests. Oxidation of metallic materials is associated with weight gain and release of reaction heat. Table 13 lists the weight change of the porous Ni sheets subject to different thermal treatments. The weight gain was insignificant during temperature ramp up from room temperature to 400° C. (about 200 min). About 0.7 to 0.9% weight gain due to oxidation was observed after the substrate was exposed to 2% $O_2$ for 4 h at 400° C. Further exposure to $N_2$ only gas at 600° C. for 4 h resulted in minimal weight change, while further exposure to 2.7% dilute $H_2$&$H_2O/N_2$ mixture at 850° C. for 4 h resulted in a weight decrease. The decreased weight indicates that the oxidized metallic material was reduced back to the metal in a reducing gas environment.

Figure 16:
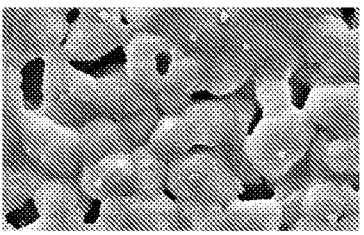
FIG. 16 includes micrographs showing the effects of thermal treatments on Ni sheets as described by embodiments of the present invention.
Figure 16:
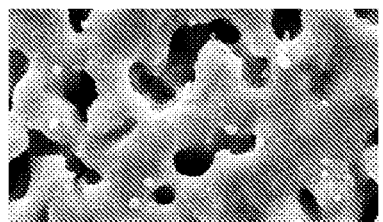
Figure 16:
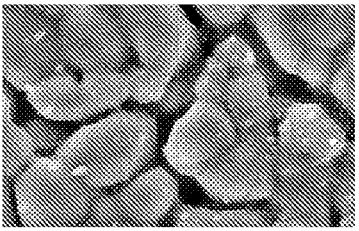
Figure 16:
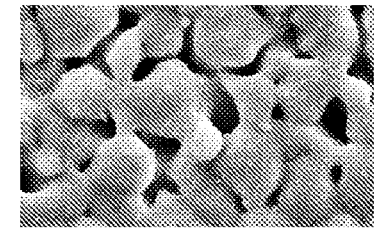

The porous Ni sheet is chemically stable to the $N_2$ or reducing gas at high temperatures. However, significant sintering of the exterior surface of the porous sheet can occur if the sheet is treated in reducing or inert gas at high temperatures (≥800° C.). FIG. 16 demonstrates the effects of thermal treatment on sintering of porous Ni sheets prepared by the sintering/reduction processing route for sheets with and without impregnation of 20 wt % $ZrO_2$ colloidal solution. In some embodiments, the thermal stability of the porous metal sheet is enhanced by using different metallic materials or by proper modification with anti-sintering additives. For example, the thermal stability of the porous Ni sheets can be dramatically enhanced by incorporation of small amounts of nano-ceramic materials into the structure. Compared to the as-prepared porous Ni sheet #3 in Table 13, the modification significantly decreased the weight loss under the same thermal treatment conditions, which suggests inhibition of Ni metal oxidation.

Chemical stability of the porous Ni sheets was examined by immersing the sheets in various water solutions having different pH values at 85° C. The Ni sheet prepared via the sintering/reduction processing route was pre-treated in 2% $O_2/N_2$ gas at 400° C. and in 3% $H_2/N_2$ at 850° C., respectively. The pretreatment was intended to result in different surface states of the porous Ni sheet. The weight gains of the pre-treated Ni sheet after immersed in different water solutions are listed in Table 14. Heating in hot water for 1 day did not cause an weight change. No Or little weight change was observed after the Ni sheet was immersed in PH=12.3 solution for a day. However, a significant weight gain was shown after the Ni sheet was immersed in a hot PH=2.3 solution. The weight gain was due to reaction of the metallic Ni with water into Ni oxides and hydrogen, which was evidenced by the evolution of gas bubbles. Thus, the porous Ni sheet appears to have a good stability in pure water or basic solution. Surface modification and/or passivation is needed to make it stable in acidic solutions, and such modification is embodied by the present invention,

TABLE 14

Weight change of porous Ni sheets treated in different water solutions (the sheet prepared via. standard sintering/reduction (processing route).

| Solution treatment | pretreated for 4 h at 400° C. in 2% $O_2$ | pretreated for 4 h at 850° C. in 3% $H_2/N_2$ |
| --- | --- | --- |
| 85° C. in water, 1 day | 0% | 0% |
| 85° C., pH = 12.3 NaOH/$H_2O$, 1 day | 0.0% | 0.1% |

TABLE 13

Weight change of porous Ni sheets after different thermal treatment

| Sample # | First step of heating | Δwt % | Second step of heating | Δwt % |
| --- | --- | --- | --- | --- |
| | As prepared porous Ni sheet (via. sintering/reduction route) | | | |
| #1 | 4 h at 400° C., ramped at 2° C./min from 22° C., in 2% $O_2/N_2$ | 0.9% | 4 h at 600° C., ramped at 2° C./min from 400° C., in 2% $O_2/N_2$, in $N_2$ | 0.1% |
| #2 | 4 h at 400° C., ramped at 2° C./min from 22° C., in 2% $O_2/N_2$ | 0.7% | 4 h at 850° C., ramped at 5° C./min from 400° C., 4 h in 2.7% $H_2$/3% $H_2O$/bal $N_2$ | −0.7% |
| #3 | 2 h at 450° C., ramped at 5° C./min from 22° C., in air | 2.7% | 4 h at 550° C., ramped at 3° C./min from 450° C., in air | 4.5% |
| | Addition of nano-sintering inhibitor into porous Ni sheet #3 | | | |
| #3 modified | 2 h at 450° C., ramped at 5° C./min from 22° C., in air | 0.1% | 4 h at 550° C., ramped at 3° C./min from 450° C., in air | 0.9% |

TABLE 14-continued

Weight change of porous Ni sheets treated in different
water solutions (the sheet prepared via. standard
sintering/reduction (processing route).

| Solution treatment | pretreated for 4 h at 400° C. in 2% $O_2$ | pretreated for 4 h at 850° C. in 3% $H_2/N_2$ |
|---|---|---|
| 85° C. in pH = 2.3 acetic acid/$H_2O$, 6 h | 17.2% | 20.7% |

Gas and water permeability of the porous Ni sheets were measured to confirm applicability as an effective membrane support. The gas permeability is characterized by air permeation at root temperature, white the liquid permeability is characterized by water. The measured air permeability of as-prepared 50 μm-thick porous Ni sheets ranged from 1 to $3.0 \times 10^{-4}$ mol/(m²·s·Pa) and is about two to three orders of magnitude higher than the gas separation permeance, $1.0 \times 10^{-6}$ to $10^{-7}$ mol/(m²·s·Pa), expected from a highly-permeable gas-separation membrane.

Figure 17A:
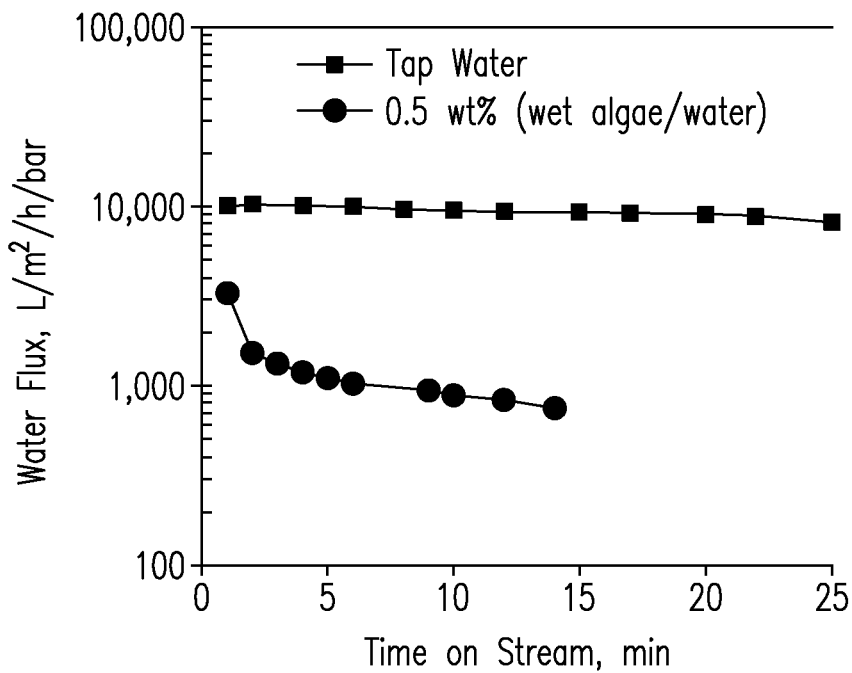
FIG. 17 includes graphs showing water permeability and algae filtration flux of a porous Ni sheet according to embodiments of the present invention.
Figure 17B:
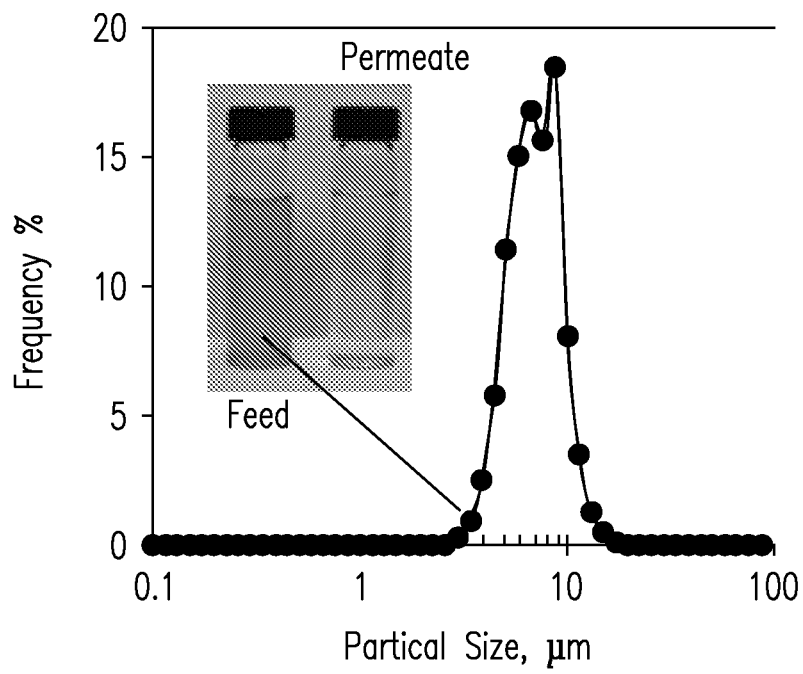

Water permeability of the porous Ni sheets was measured with tap water in a cross-flow operation. The graph in FIG. 17a shows water flux as high as 10,000 liter/m²/h/bar. The gradual decline of the water flux was due to accumulation of particulates and debris on the Ni surface. The as-prepared porous Ni sheet may be directly used as a micro-filtration membrane for certain applications. Referring to FIG. 17b, filtration tests with a micro-algae culture solution show that the micro-algae cells of sizes from 2 to 20 μm can be completely blocked by the porous Ni sheet. The algae filtration flux is about one order of magnitude lower than the tap water, which is due to formation of algae filtration cake layer on the membrane surface While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method of fabricating a thin, porous metal sheet, the method characterized by the steps of:
   Preparing a slurry comprising between 10 and 50 wt % solvent and between 20 and 80 wt % non-metallic powder of a metal oxide, metal hydride or metalorganic, the non-metallic powder comprising average particle sizes from 100 nm to 5 μm;
   Casting the slurry into a green body having a thickness between 10 and 200 μm;
   Firing the green body thereby converting the metal oxide, metal hydride or metalorganic into a metallic state and yielding a fired body; and
   Sintering, annealing or flattening the fired body to yield the thin, porous metal sheet having a metallic backbone of networked pore structures in three dimensions with a porosity between 25% and 75% by volume, and with an average pore diameter less than or equal to 2 μm.

2. The method of claim 1, further comprising adding up to 30 wt % of a pore former to the slurry, the pore former comprising average particle sizes between 100 nm and 10 μm, wherein said firing substantially removes the pore former.

3. The method of claim 2, wherein the pore former is selected from the group consisting of carbon black, graphite, coke, starch materials, and combinations thereof.

4. The method of claim 1 further comprising adding up to 15 wt % of organic additives to the slurry, the organic additives selected from the group consisting of dispersants, binders, plasticizers, and combinations thereof, wherein said firing substantially removes the organic additives.

5. The method of claim 1, wherein said firing further comprises heating the green body in a reducing environment at a ramp rate between 0.2 and 10° C./min to a firing temperature between 400 and 1200° C. and maintaining the firing temperature for a period between 30 minutes and 24 hours.

6. The method of claim 1, wherein said preparing the slurry comprises ball-milling constituents of the slurry.

7. The method of claim 1, further comprising ball-milling or attrition milling the metal precursor.

8. The method of claim 1, wherein the thin metal sheet and the metal precursor comprise a metal selected from the group consisting of Ni, NiFe alloy, Ni—Cu alloy, stainless steel alloy, Ti, Ti alloy, and combinations thereof.

9. The method of claim 1, wherein said firing further comprises heating the green body in an oxidizing environment to a first temperature between 800 and 1400° C. followed by heating in a reducing environment to a second temperature between 400 and 1200° C. for a period of 30 minutes to 24 hours.

10. The method of claim 9, wherein a ramp rate to the first temperature is less than or equal to 10° C. per minute.

11. The method of claim 1, wherein said sintering or annealing occur in an inert or reducing environment at temperatures below the metal melting point and approximately equal to a softening point of the metal.

12. The method of claim 1, further comprising depositing a ceramic, an anti-sintering material, or both inside pores of the porous metal body, the ceramic or anti-sintering material having an average particle size between 1 and 200 nm.

13. The method of claim 1, wherein said casting comprises casting the slurry into two or more green body sheets each having a thickness from 10 to 100 μm and laminating the two or more green body sheets into a single laminate, and wherein said firing comprises firing the single laminate to convert the metal precursor into a metallic state and to yield a fired body.

14. The method of claim 13, wherein said laminating comprises laminating together a first green body sheet having pores with an average diameter less than or equal to 10 μm and at least one green body sheet having pores with an average diameter less than or equal to 2 μm, wherein the pores on one side of the thin, porous metal sheet have an average pore diameter less than or equal to 10 μm and the pores of the opposite side have an average diameter less than or equal to 2 μm.

15. The method of claim 13, wherein the slurry composition for each green body differs, thereby yielding a thin, porous metal sheet having a graded composition, a graded pore structure, or both.

16. A method of fabricating a thin, porous metal sheet, the method characterized by the steps of:
   Preparing a slurry comprising between 10 and 50 wt % solvent, up to 30 wt % pore former comprising average particle sizes between 100 nm and 10 μm, and between 20 and 80 wt % non-metallic powder of a metal precursor comprising average particle sizes between 100 nm and 5 μm, wherein the metal precursor comprises metal oxide;
   Casting the slurry into a green body having a thickness between 10 and 200 um;
   Firing the green body to convert the metal precursor into a metallic state, to remove the pore former, and to yield a fired body, said firing comprising heating the green body in an oxidizing environment to a first temperature between 800 and 1400° C. followed by heating in a reducing environment to a second temperature between 400 and 1200° C. for a period of 30 minutes to 24 hours; and, thereby, Yielding a metallic backbone of networked pore structures in three dimensions with a porosity between 25% and 75% by volume, and with an average pore diameter less than or equal to 2 μm.

17. The method of claim 16, further comprising sintering, annealing or flattening the fired body to enhance surface smoothness, mechanical strength, or both.

18. A method of fabricating a thin, porous metal sheet, the method characterized by the steps of:
preparing a slurry comprising between 10 and 50 wt % solvent, up to 30 wt. % pore former comprising average particle sizes between 10 nm and 5 μm, and between 20 and 80 wt % non-ductile, metal element-containing particles with an average particle size between 100 nm and 5 μm;
casting the slurry into a green body having a thickness between 10 and 200 um;
drying the green body to substantially free of volatile solvent;
removing the organics and pore formers, reducing the metal element-containing particles into metal particles, and sintering metal particles by heating the green tape in hydrogen gas at a temperature within the range from 400 and 1200° C. for a period of 30 minutes to 24 hours; and, thereby,
yielding a metallic backbone of networked pore structures in three dimensions with a porosity between 25% and 75% by volume, and with an average pore diameter less than or equal to 2 μm.

19. The method of claim 18, wherein the non-ductile, metal element-containing particles are metal oxides, metalorganic, or metal hydride.

20. The method of claim 18, wherein the pore former is selected from the group consisting of carbon black, graphite, coke, and combinations thereof, wherein the pore former can be removed concomitantly during reduction of the metal element-containing particle by heating in hydrogen gas at high temperatures.

21. The method of claim 18, further comprising adding up to 15 wt % of organic additives to the slurry, the organic additives selected from the group consisting of dispersants, binders, plasticizers, and combinations thereof, wherein said heating in hydrogen gas substantially removes the organic additives.

22. The method of claim 18, wherein the hydrogen gas stream contains 70% hydrogen.

23. The method of claim 18, wherein said preparing the slurry comprises ball-milling constituents of the slurry in a sequence of mixing the pore former, dispersant and solvent first, followed with an addition of the metal element-containing particles.

24. The method of claim 18, the non-ductile, metal element-containing particles are prepared by ball-milling or attrition milling of the same materials comprising large agglomerates with particle sizes above 5 μm.

25. The method of claim 18, wherein a ramp rate from the room temperature to hydrogen reaction temperature is less than or equal to 10° C. per minute, preferably less than 2° C./min.

26. The method of claim 18, wherein said casting comprises casting the slurry into two or more green body sheets each having a thickness from 10 to 100 μm and laminating the two or more green body sheets into a single laminate, and wherein said firing comprises firing the single laminate to convert the metal precursor into a metallic state and to yield a fired body.

27. The method of claim 26, wherein said laminating comprises laminating together a first green body sheet having pores with an average diameter less than or equal to 10 μm and at least one green body sheet having pores with an average diameter less than or equal to 2 μm, wherein the pores on one side of the thin, porous metal sheet have an average pore diameter less than or equal to 10 μm and the pores of the opposite side have an average diameter less than or equal to 2 μm.

28. The method of claim 26, wherein the slurry composition for each green body differs, thereby yielding a thin, porous metal sheet having a graded composition, a graded pore structure, or both.

* * * * *